US007972717B2

(12) United States Patent
Meguro et al.

(10) Patent No.: US 7,972,717 B2
(45) Date of Patent: Jul. 5, 2011

(54) BATTERY

(75) Inventors: Takeshi Meguro, Fukushima (JP);
Yoshihiro Dokko, Fukushima (JP);
Hiroyuki Suzuki, Fukushima (JP);
Tadashi Miebori, Fukushima (JP);
Shinji Hatake, Fukushima (JP); Yuzuru Fukushima, Miyagi (JP); Noriaki Kokubu, Fukushima (JP)

(73) Assignee: Sony Corporation, Tokyo (JP)

( * ) Notice: Subject to any disclaimer, the term of this patent is extended or adjusted under 35 U.S.C. 154(b) by 1032 days.

(21) Appl. No.: 11/620,520

(22) Filed: Jan. 5, 2007

(65) Prior Publication Data

US 2007/0166605 A1     Jul. 19, 2007

(30) Foreign Application Priority Data

Jan. 13, 2006   (JP) ................................. 2006-006278
Jun. 27, 2006   (JP) ................................. 2006-176658

(51) Int. Cl.
*H01M 2/34* (2006.01)
*H01M 4/02* (2006.01)
*H01M 10/05* (2010.01)

(52) U.S. Cl. ............................................. 429/7; 429/61
(58) Field of Classification Search .................. 429/7, 61
See application file for complete search history.

(56) References Cited

U.S. PATENT DOCUMENTS

| 5,925,482 A | 7/1999 | Yamashita |
| 6,054,233 A * | 4/2000 | Vourlis ............................ 429/61 |
| 6,869,725 B2 | 3/2005 | Iwanaga et al. |
| 2005/0250008 A1* | 11/2005 | Mizutani et al. ............... 429/209 |
| 2006/0078793 A1* | 4/2006 | Seino .......................... 429/218.1 |

FOREIGN PATENT DOCUMENTS

| JP | 4-332481 | 11/1992 |
| JP | 08-250155 | 9/1996 |
| JP | 08-255631 | 10/1996 |
| JP | 08-264206 | 10/1996 |
| JP | 08-273697 | 10/1996 |
| JP | HEI 09-219212 | 8/1997 |
| JP | HEI 09-270251 | 10/1997 |
| JP | HEI 09-306545 | 11/1997 |
| JP | HEI 10-116633 | 5/1998 |
| JP | HEI 11-073941 | 3/1999 |
| JP | 11-204130 | 7/1999 |
| JP | 11-204140 | 7/1999 |
| JP | HEI 11-329493 | 11/1999 |
| JP | 2000-277161 | 10/2000 |
| JP | 2000-294226 | 10/2000 |
| JP | 2001-229905 | 8/2001 |
| JP | 2003-092148 | 3/2003 |
| JP | 2003-229177 | 8/2003 |
| JP | 2005-353582 | 12/2005 |

* cited by examiner

*Primary Examiner* — Gregg Cantelmo
(74) *Attorney, Agent, or Firm* — K&L Gates LLP

(57) ABSTRACT

A battery with improved safety which can establish a short circuit between electrodes more reliably when the battery is crushed by an external force is provided. A battery includes a battery element including a cathode and an anode, a battery can containing the battery element, and a conductive short circuit member arranged in a gap between the battery element and the battery can, the short circuit member capable of biting into the battery element when the battery can is deformed.

15 Claims, 23 Drawing Sheets

BATTERY

CROSS REFERENCES TO RELATED APPLICATIONS

The present application claims priority to Japanese Patent Application JP 2006-006278 filed in the Japanese Patent Office on Jan. 13, 2006 and Japanese Patent Application JP 2006-176658 filed in the Japanese Patent Office on Jun. 27, 2006, the entire contents of which are being incorporated herein by references.

BACKGROUND

The present application relates to a battery including a battery element in a battery can.

In recent years, a large number of portable electronic devices such as camcorders, cellular phones and laptop computers have been emerged, and an attempt to reduce the size and the weight of them has been made. Research and development aimed at improving the energy densities of batteries used as portable power sources of the electronic devices, specifically secondary batteries as key devices have been actively promoted. Among the batteries, non-aqueous electrolyte secondary batteries (for example, lithium-ion secondary batteries) can obtain a high energy density, compared to lead-acid batteries and nickel cadmium batteries which are aqueous electrolyte solution secondary batteries in related arts, so studies for improving the energy density have been conducted in various quarters.

Lithium-ion secondary batteries with various shapes have been developed, and among them, there is a lithium-ion secondary battery in which a cathode and an anode are laminated with a separator in between and are spirally wound to form a spirally wound body, and a cylindrical center pin made of metal or a resin material is inserted into the center of the spirally wound body (for example, refer to Japanese Unexamined Patent Application Publication Nos. H4-332481 and H11-204140).

FIG. 33 shows an example of a center pin in a related art. The center pin has a slit 131 in an axial direction of a cylindrical main body 130 made of, for example, metal. When an external force is applied to the battery, the main body 130 is crushed, and as a result, the edge of the slit 131 opens out, and the opened part penetrates the separator to establish a short circuit between the cathode and the anode. Thereby, a battery reaction is prevented to safely lose a power generation function.

However, in a secondary battery using a center pin with the above-described structure in the related art, the deformation of a slit portion in the case where the center pin is crushed by an external force is not sufficient, so it is difficult to reliably establish a short circuit between the cathode and the anode. Therefore, an effective technique for more reliably establishing a short circuit between electrodes to secure safety is desired.

Moreover, in a so-called prismatic battery using a rectangular battery can, a battery element formed by spirally winding a cathode and an anode to form a spirally wound body, and then forming the spirally wound body in a flat shape is used, so it is difficult to insert the above-described cylindrical center pin in the related art into the center of such a flat battery element.

Further, in the case of a large size battery, when the battery is crushed by an external force, it is difficult to obtain a sufficient effect of preventing power generation only by a short circuit by a center pin inserted into the center of a spirally wound battery element.

It is disclosed in Japanese Unexamined Patent Application Publication No. 2001-229905 that a perforated plate made of metal such as stainless steel is arranged between a closed end surface of a battery can and a bottom surface of a battery element, and gas-discharging holes are arranged in the center and a peripheral part of the perforated plate to guide a gas to a safety valve.

SUMMARY

In view of the foregoing, it is desirable to provide a battery with improved safety capable of establishing a short circuit between electrodes more reliably when the battery is crushed by an external force.

According to an embodiment, there is provided a battery including: a battery element including a cathode and an anode; a battery can containing the battery element; and a conductive short circuit member arranged in a gap between the battery element and the battery can, the short circuit member capable of biting into the battery element when the battery can is deformed.

In the battery according to the embodiment, a conductive short circuit member is arranged in a gap between the battery element and the battery can, so in the case where an external force is applied to the battery, when the battery can is deformed, the short circuit member is pushed and bites into the battery element, and penetrates the separator, thereby the cathode and a short circuit between the anode are reliably established.

In particular, in the case where the battery element has a structure in which the cathode including a cathode active material layer on a surface of a strip-shaped cathode current collector and the anode including an anode active material layer on a surface of a strip-shaped anode current collector are laminated with a separator in between and spirally wound, and the cathode includes a cathode exposed region not including the cathode active material layer on both surfaces in an end portion on an outer side of the wound cathode, and the anode includes an anode exposed region not including anode active material layer on both surfaces in an end portion on an outer side of the wound anode, the exposed region of the cathode current collector with low resistance and the exposed region of the anode current collector with low resistance are directly short-circuited, so a short circuit via the cathode active material layer with high resistance is not established, so an increase in temperature in the cathode active material layer is prevented.

In the battery according to the embodiment, a conductive short circuit member capable of biting into the battery element when the battery can is deformed is arranged in a gap between the battery element and the battery can, so in the case where the battery can is crushed or bent by an external force, the cathode and the anode can be reliably short-circuited, and safety is improved. In particular, the battery according to the embodiment of the invention is suitable for a prismatic battery in which it is difficult to use a cylindrical center pin or a large-size battery with a high heating value, and can obtain high safety.

In particular, in the case where the anode includes an anode active material capable of inserting and extracting an electrode reactant and including at least one kind selected from metal elements and metalloid elements as an element, the energy density of the battery is large, and higher safety is desired, so higher effects can be obtained.

Additional features and advantages are described herein, and will be apparent from, the following Detailed Description and the figures.

DETAILED DESCRIPTION

Figure 1:
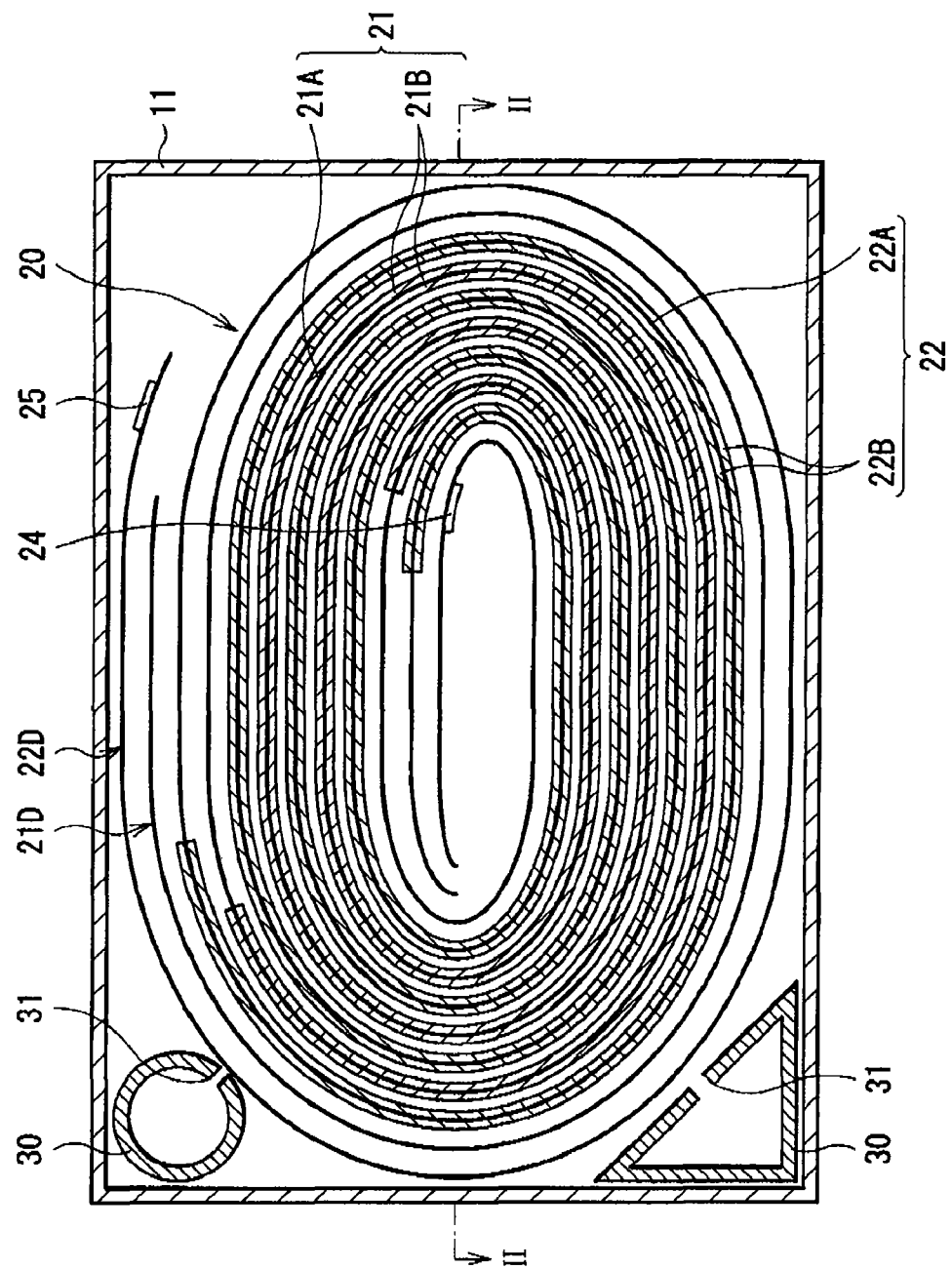
FIG. 1 is a sectional view of the structure of a secondary battery according to a first embodiment.

Embodiments will be described in detail below referring to the accompanying drawings. In the drawings, the shapes, the sizes and the positional relationships of components are schematically shown to the extent that the description can be understood, so the dimensions in the drawings are different from actual dimensions.

Figure 2:
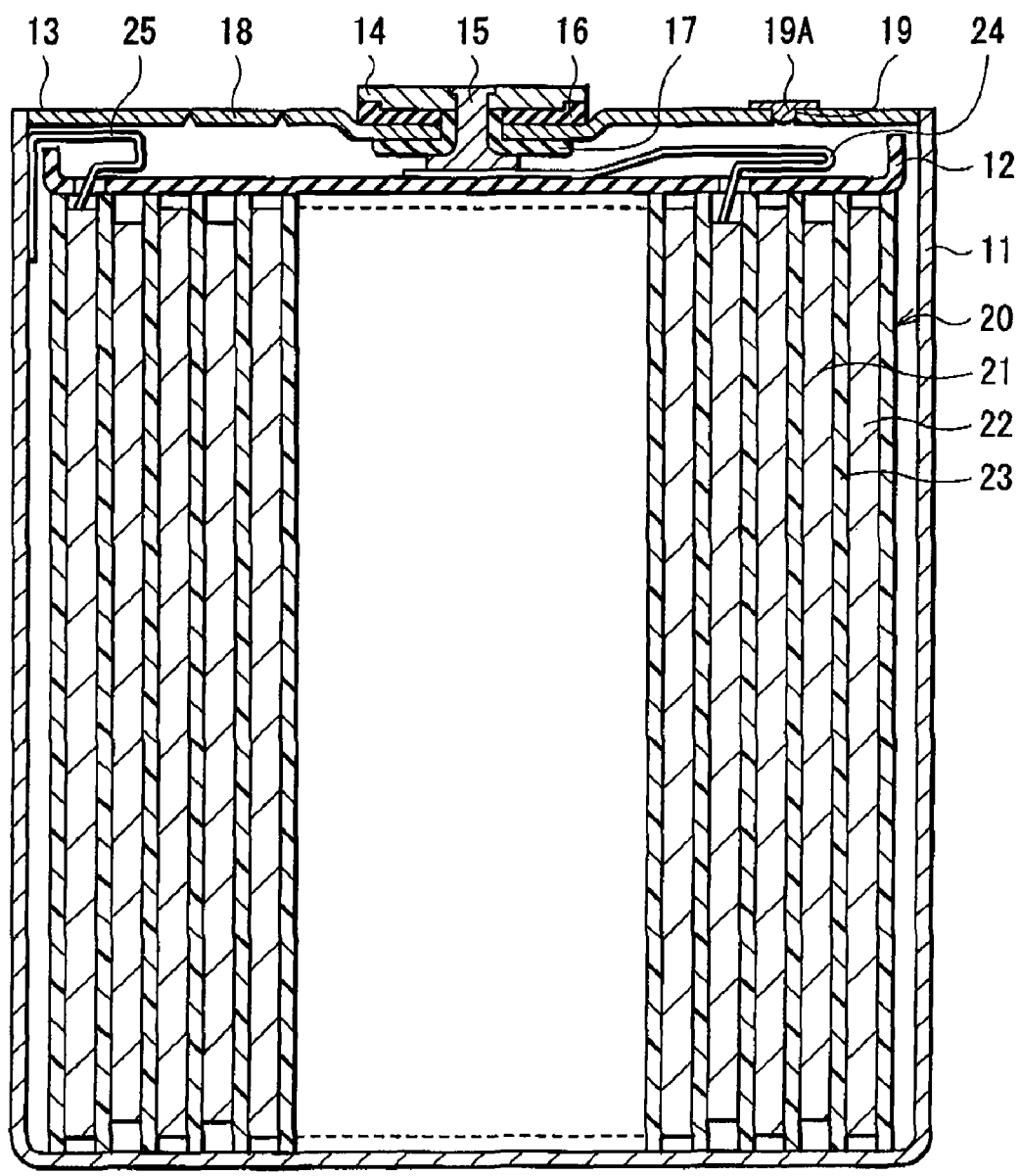
FIG. 2 is a sectional view taken along a line II-II of FIG. 1.

FIGS. 1 and 2 show sectional views of a secondary battery according to a first embodiment of the invention. The secondary battery is a so-called prismatic type, and includes a flat battery element 20 in a substantially hollow rectangular battery can 11.

The battery can 11 is made of nickel (Ni)-plated iron (Fe), and has a function as an anode terminal. An end portion of the battery can 11 is closed, and the other end portion thereof is opened. An insulating plate 12 and a battery cover 13 are attached in the opened end portion to seal the battery can 11. The insulating plate 12 is made of polypropylene or the like, and is arranged on the battery element 20 in a direction perpendicular to a peripheral winding surface. The battery cover 13 is made of, for example, the same material as that of the battery can 11, and has a function as an anode terminal together with the battery can 11. A terminal plate 14 as a cathode terminal is arranged on the outer side of the battery cover 13. Moreover, a through hole is arranged around the center of the battery cover 13, and a cathode pin 15 electrically connected to the terminal plate 14 is inserted into the through hole. The terminal plate 14 and the battery cover 13 are electrically insulated form each other by an insulating case 16, and the cathode pin 15 and the battery cover 13 are insulated from each other by a gasket 17. The insulating case 16 is made of, for example, polybutylene terephthalate. The gasket 17 is made of, for example, an insulating material of which surface is covered with asphalt.

A cleavage valve 18 and an electrolyte solution injection hole 19 are arranged around the edge of the battery cover 13. The cleavage valve 18 is electrically connected to the battery cover 13, and when internal pressure in the battery increases to a certain extent or higher due to an internal short circuit or external application of heat, the cleavage valve 18 is cleaved to prevent an increase in the internal pressure. The electrolyte solution injection hole 19 is filled with a sealing member 19A made of, for example, stainless steel balls.

The battery element 20 is formed by laminating a cathode 21 and an anode 22 with a separator 23 in between, and spirally winding them, and is formed into a flat shape according to the shape of the battery can 11. A cathode lead 24 made of aluminum (Al) is connected to the cathode 21 of the battery element 20, and an anode lead 25 made of nickel is connected to the anode 22. The cathode lead 24 is welded to a bottom end of the cathode pin 15 to be electrically connected to the terminal plate 14, and the anode lead 25 is welded and electrically connected to the battery can 11.

Figure 3:
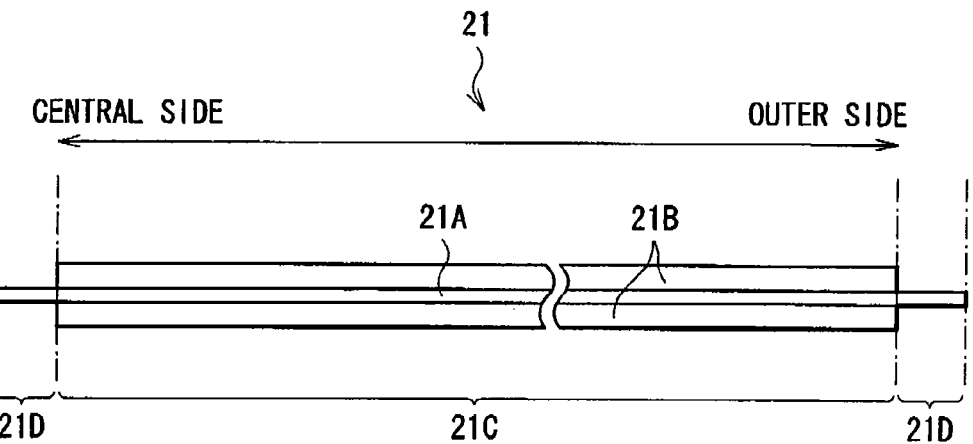
FIG. 3 is a sectional view of the structure of a cathode shown in FIG. 1 before spirally winding the cathode.

FIG. 3 shows the cathode 21 shown in FIG. 1 before spirally winding the cathode 21. The cathode 21 is formed by arranging a cathode active material layer 21B on both surfaces of a strip-shaped cathode current collector 21A. More specifically, the cathode 21 includes a cathode coating region 21C where the cathode active material layer 21B exists on the outer and inner surfaces of the cathode current collector 21A. In addition, in the cathode 21, end portions on the central and outer sides of the wound cathode 21 are cathode exposed regions 21D, that is, regions where the cathode active material layer 21B does not exist on both surfaces of the cathode current collector 21A, and the cathode current collector 21A is exposed.

The cathode current collector 21A has, for example, a thickness of approximately 5 μm to 50 μm, and is made of metal foil such as aluminum foil, nickel foil or stainless foil.

As a cathode active material, the cathode active material layer 21B includes, for example, one kind or two or more kinds of cathode materials capable of inserting and extracting lithium as an electrode reactant, and may include an electrical conductor such as a carbon material and a binder such as polyvinylidene fluoride, if necessary. Examples of the cathode material capable of inserting and extracting lithium include metal sulfide not including lithium such as titanium sulfide ($TiS_2$), molybdenum sulfide ($MoS_2$), niobium selenide ($NbSe_2$) or vanadium oxide ($V_2O_5$), metal selenide, metal oxide and a lithium-containing compound including lithium.

Among them, the lithium-containing compound is preferable, because a high voltage and a high energy density can be obtained. Examples of such a lithium-containing compound include complex oxide including lithium and a transition metal element and a phosphate compound including lithium and a transition metal element, and specifically, a lithium-containing compound including at least one kind selected from the group consisting of cobalt (Co), nickel and manganese (Mn) is preferable, because a higher voltage can be obtained. The chemical formula of the lithium-containing compound is represented by, for example, $Li_xMIO_2$ or $Li_yMIIPO_4$. In the formulas, MI and MII represent one or more kinds of transition metal elements. In the formulas, the values of x and y depend upon a charge-discharge state of the battery, and are generally within a range of $0.05 \leq x \leq 1.10$ and $0.05 \leq y \leq 1.10$, respectively.

Specific examples of the complex oxide including lithium and a transition metal element include lithium-cobalt complex oxide ($Li_xCoO_2$), lithium-nickel complex oxide ($Li_xNiO_2$), lithium-nickel-cobalt complex oxide ($Li_xNi_{1-z}Co_zO_2$ (z<1)), lithium-manganese complex oxide ($LiMn_2O_4$) having a spinel structure and the like. Among them, a complex oxide including nickel is preferable, because a high capacity and superior cycle characteristics can be obtained. Specific examples of the phosphate compound including lithium and a transition metal element include lithium-iron phosphate compound ($LiFePO_4$) and a lithium-iron-manganese phosphate compound ($LiFe_{1-v}Mn_vPO_4$ (V<1)).

Figure 4:
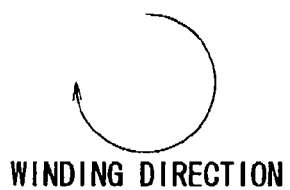
FIG. 4 is a sectional view of the structure of an anode shown in FIG. 1 before spirally winding the anode.
Figure 4:
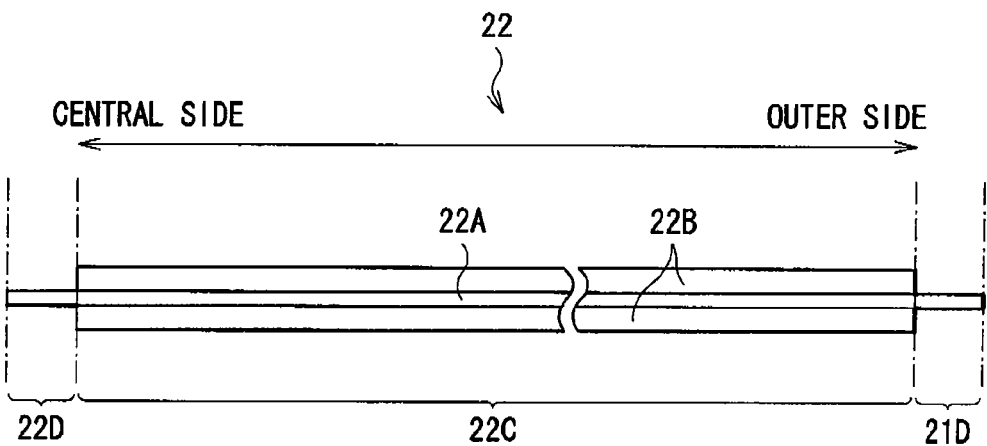

FIG. 4 shows the structure of the anode 22. The anode 22 is formed by arranging an anode active material layer 22B on both surfaces of a strip-shaped anode current collector 22A. More specifically, the anode 22 includes an anode coating region 22C where the anode active material layer 22B exists on the outer and inner surfaces of the anode current collector 22A and an anode exposed region 22D where the anode active material layer 22B does not exist on both surfaces of the anode current collector 22A in end portions on the central and outer sides of the wound anode 22.

The anode current collector 22A is made of, for example, metal foil such as copper foil, nickel foil or stainless foil. The thickness of the anode current collector 22A is, for example, 5 μm to 50 μm.

The anode active material layer 22B includes, for example, an anode active material, and may include another material such as an electrical conductor or a binder, if necessary. As the anode active material, for example, an anode material capable of inserting and extracting lithium as an electrode reactant and including at least one kind selected from the group consisting of metal elements and metalloid elements as an element is cited. Such an anode material is preferably used, because a high energy density can be obtained. The anode material may be a simple substance, an alloy or a compound of a metal element or a metalloid element, or a material including a phase including one kind or two or more kinds of them at least in part. In the present invention, the alloy means an alloy including two or more kinds of metal elements as well as an alloy including one or more kinds of metal elements and one or more kinds of metalloid elements. Moreover, the alloy may include a non-metal element. As the texture of the alloy, a solid solution, a eutectic (eutectic mixture), an intermetallic compound or the coexistence of two or more kinds selected from them is cited.

As the metal element or the metalloid element included in the anode material, for example, a metal element or a metalloid element capable of forming an alloy with lithium is cited. More specifically, magnesium (Mg), boron (B), aluminum (Al), gallium (Ga), indium (In), silicon, germanium (Ge), tin, lead (Pb), bismuth (Bi), cadmium (Cd), silver (Ag), zinc (Zn), hafnium (Hf), zirconium (Zr), yttrium (Y), palladium (Pd), platinum (Pt) or the like is cited.

As the anode material, an anode material including a Group 14 metal element or a Group 14 metalloid element in the long form of the periodic table of the elements among them is preferable, and in particular, an anode material including at least one of silicon and tin as an element is preferable, because silicon and tin have a high capability to insert and extract lithium, and can obtain a high energy density. More specifically, for example, a simple substance, an alloy or a compound of silicon, or a simple substance, an alloy or a compound of tin, or a material including a phase including one kind or two or more kinds of them at least in part is cited.

As a tin alloy, for example, a tin alloy including at least one kind selected from the group consisting of silicon, nickel, copper, iron (Fe), cobalt (Co), manganese (Mn), zinc (Zn), indium (In), silver (Ag), titanium (Ti), germanium (Ge), bismuth (Bi), antimony (Sb) and chromium (Cr) as a second element in addition to tin is cited. As a silicon alloy, for example, a silicon alloy including at least one kind selected from the group consisting of tin, nickel, copper, iron, cobalt, manganese, zinc, indium, silver, titanium, germanium, bismuth, antimony and chromium as a second element in addition to silicon is cited.

As a compound of tin or silicon, for example, a compound including oxygen (O) or carbon (C) is cited, and in addition to tin or silicon, the compound may include the above-described second element.

Among them, as the anode material, a CoSnC-containing material in which tin, cobalt and carbon are included as elements, and the carbon content is within a range from 9.9 wt % to 29.7 wt % inclusive, and the ratio of cobalt to the total of tin and cobalt is within a range from 30 wt % to 70 wt % inclusive is preferable, because a high energy density and superior cycle characteristics can be obtained within such a composition range.

The CoSnC-containing material may further include any other element, if necessary. As the element, for example, silicon, iron, nickel, chromium, indium, niobium (Nb), germanium, titanium, molybdenum (Mo), aluminum (Al), phosphorus (P), gallium (Ga) or bismuth is preferable, and two or more kinds selected from them may be included. It is because the capacity and the cycle characteristics can be further improved.

The CoSnC-containing material includes a phase including tin, cobalt and carbon, and the phase preferably has a low crystalline structure or an amorphous structure. Moreover, in the CoSnC-containing material, at least a part of carbon as an element is preferably bonded to a metal element or a metalloid element as another element. It is considered that a decline in the cycle characteristics is caused by cohesion or crystallization of tin or the like; however, when carbon is bonded to another element, such cohesion or crystallization can be inhibited.

As a measuring method for checking the bonding state of an element, for example, X-ray photoelectron spectroscopy (XPS) is used. In XPS, the peak of the 1s orbit (C1s) of carbon in the case of graphite is observed at 284.5 eV in an apparatus in which energy calibration is performed so that the peak of the 4f orbit (Au4f) of a gold atom is observed at 84.0 eV. Moreover, the peak of C1s of the surface contamination carbon is observed at 284.8 eV. On the other hand, in the case where the charge density of the carbon element increases, for example, in the case where carbon is bonded to a metal element or a metalloid element, the peak of C1s is observed in a region lower than 284.5 eV. In other words, in the case where the peak of the composite wave of C1s obtained in the CoSnC-containing material is observed in a region lower than 284.5 eV, at least a part of carbon included in the CoSnC-containing material is bonded to the metal element or the metalloid element which is another element.

Moreover, in the XPS measurement, for example, the peak of C1s is used to correct the energy axis of a spectrum. In general, surface contamination carbon exists on a surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the CoSnC-containing material, so the peak of the surface contamination carbon and the peak of the carbon in the CoSnC-containing material are separated by analyzing the waveform through the use of, for example, commercially available software. In the analysis of the waveform, the position of a main peak existing on a lowest binding energy side is used as an energy reference (284.8 eV).

As the anode active material, a carbon material such as natural graphite, artificial graphite, non-graphitizable carbon or graphitizable carbon may be used. The carbon material is preferably used, because superior cycle characteristics can be obtained. Moreover, as the anode active material, lithium metal is cited. One kind or two or a mixture of two or more kinds of anode materials may be used.

The separator 23 shown in FIG. 1 is made of, for example, a porous film of a polyolefin-based material such as polypropylene or polyethylene, or a porous film of a inorganic material such as a nonwoven fabric of ceramic, and the separator 23 may have a structure in which two or more kinds of the porous films are laminated.

The separator 23 is impregnated with an electrolyte solution as a liquid electrolyte. The electrolyte solution includes a solvent and a lithium salt as an electrolyte salt. In the solvent, the electrolyte salt is dissolved and dissociated. As the solvent, propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetate, butyrate, propionate or the like is cited, and one kind or a mixture of two or more kinds selected from them may be used.

Examples of the lithium salt include $LiClO_4$, $LiAsF_6$, $LiPF_6$, $LiBF_4$, $LiB(C_6H_5)_4$, $CH_3SO_3Li$, $CF_3SO_3Li$, LiCl and LiBr, and one kind or a mixture of two or more kinds selected from them may be used.

Figure 5:
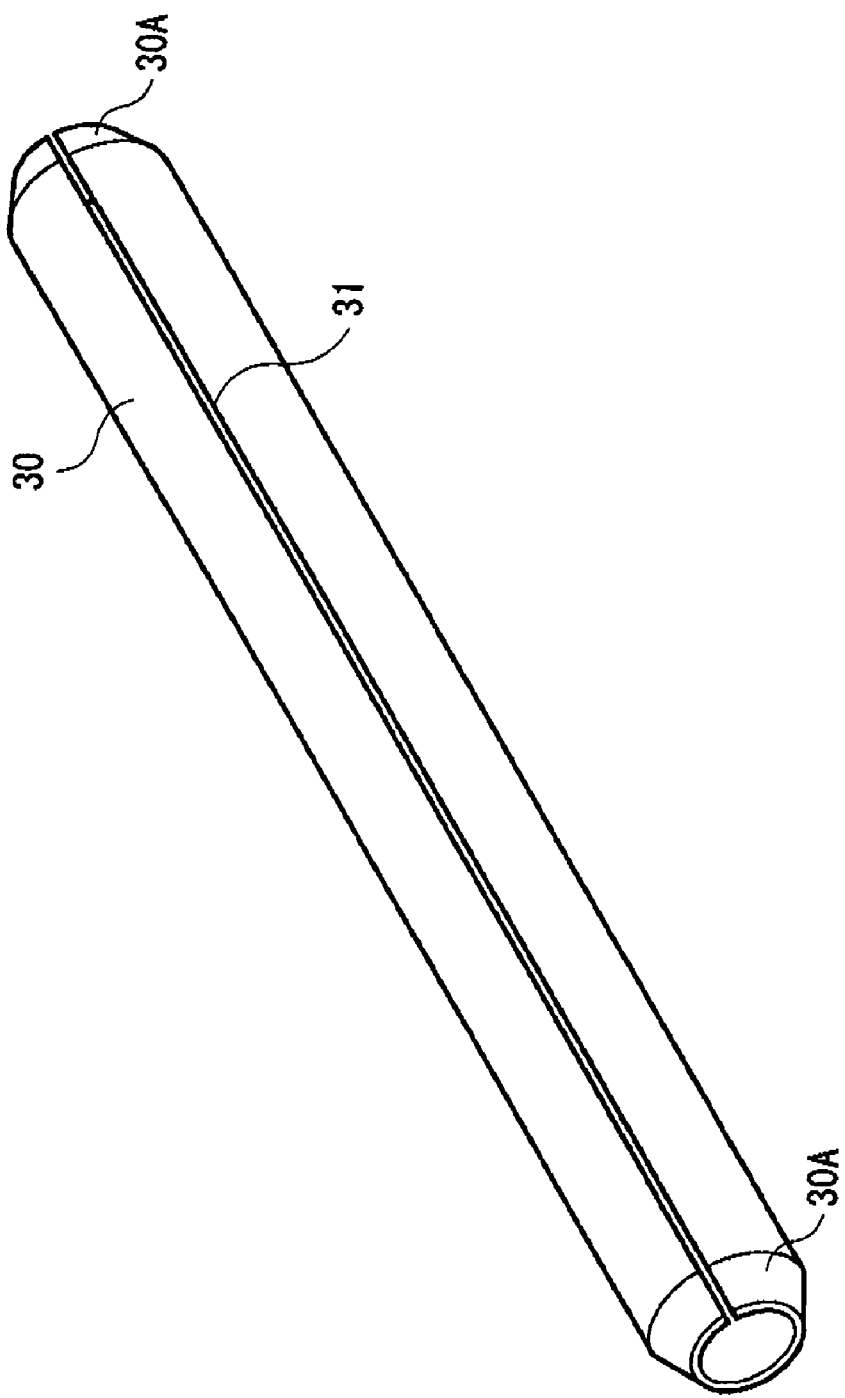
FIG. 5 is a perspective view of an example of the structure of a short circuit member.

Moreover, in the embodiment, a conductive short circuit member 30 is arranged in a gap between the battery element 20 and the battery can 11. As shown in FIG. 5, the short circuit member 30 is formed by rolling a thin strip-shaped plate to form the plate into a pipelike shape, and includes a slit 31 from one end to the other end in a longitudinal direction, and when the battery is crushed or bent by the application of an external force to cause the deformation of the battery can 11, the slit 31 can bite into the battery element 20. Thereby, in the battery, the cathode 21 and the anode 22 can be reliably short-circuited, and the safety can be improved.

In particular, the anode 22 can insert and extract an electrode reactant, and in the case where an anode active material including at least one kind selected from metal elements and metalloid elements as an element is included, the energy density of the battery is large, and higher safety is desired, so a higher effect can be obtained.

Figure 6:
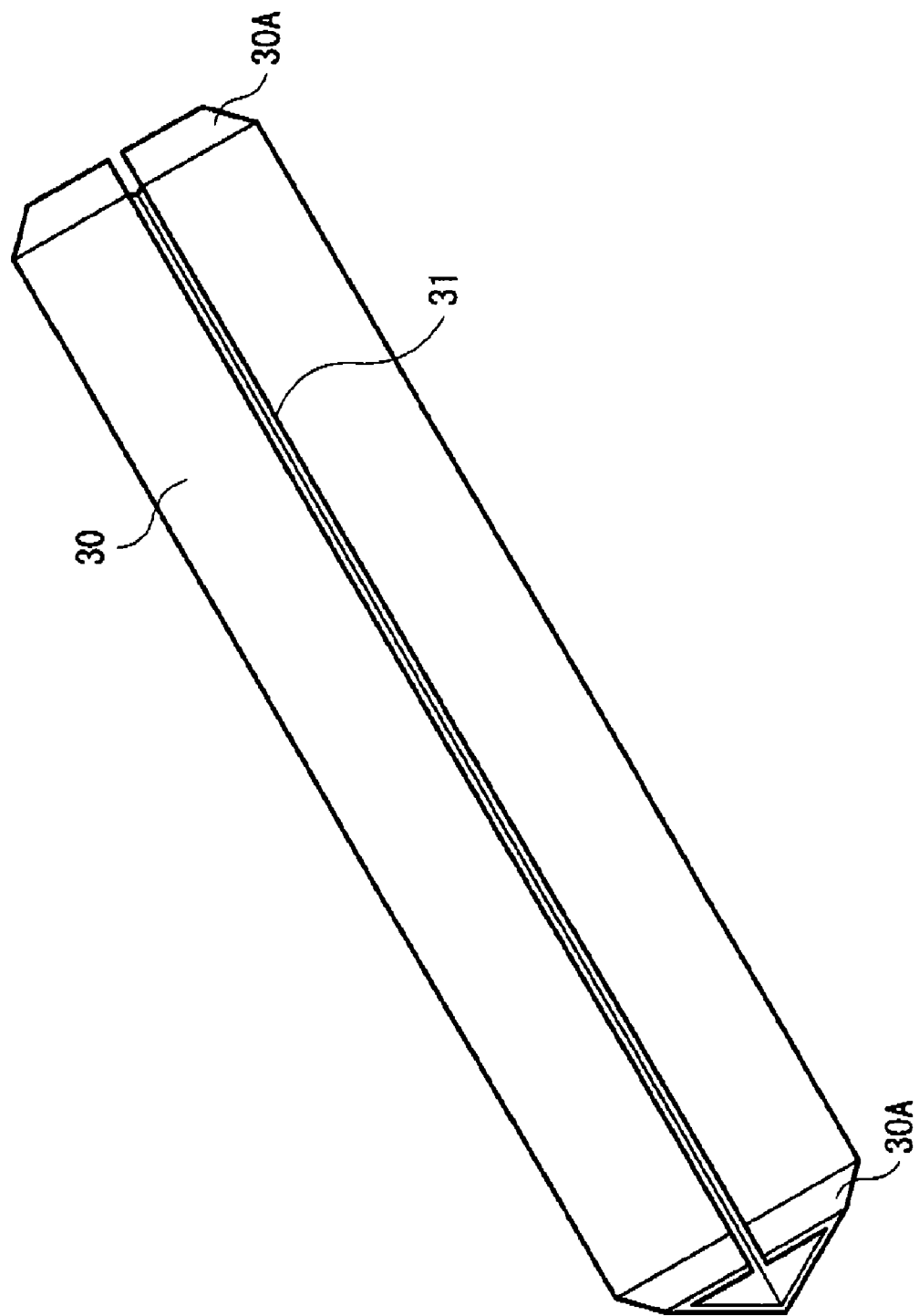
FIG. 6 is a perspective view of another example of the structure of the short circuit member.

The short circuit member 30 may have a tubular shape having a polygonal (for example, triangular) section shown in FIG. 6 according to the inner wall of the battery can 11 or the periphery of the battery element 20 in addition to a cylindrical shape. Inclined portions 30A are disposed on both ends of the short circuit member 30 so that the short circuit member 30 is easily inserted into a gap between the battery element 20 and the battery can 11 in a manufacturing step which will be described later. The dimensions of the short circuit member 30 depend on the dimensions of the secondary battery; however, for example, it is preferable that the diameter or a side is approximately 3.0 mm, and the length is 2.5 cm to 8.0 cm inclusive.

The slit 31 of the short circuit member 30 is provided by forming a gap between facing long sides when the short circuit member 30 is formed by forming a thin strip-shaped plate into a pipelike shape in a manufacturing step which will be described later. The width of the slit 31 is, for example, 0.5 mm.

The material and the thickness of the short circuit member 30 are selected so that a predetermined strength is maintained under normal conditions, and in the case where the battery is crushed by an external force, the short circuit member 30 is crushed or bent together with the battery. More specifically, as the material of the short circuit member 30, for example, stainless steel is cited. Preferably, the thickness of the short circuit member 30 is, for example, 0.05 mm to 5 mm inclusive, because when the thickness is smaller than 0.05 mm, the strength may be decreased, and when the thickness is thicker than 5 mm, it is difficult to form the short circuit member 30 into a pipelike shape.

The secondary battery can be manufactured by the following steps, for example.

At first, for example, the cathode active material, the electrical conductor and the binder are mixed to form a cathode mixture, and then the cathode mixture is dispersed in a solvent such as N-methyl-2-pyrrolidone to form paste-form cathode mixture slurry. After the cathode mixture slurry is uniformly applied to the cathode current collector 21A through the use of a doctor blade, a bar coater or the like, and the solvent is dried, the cathode mixture slurry is compression molded by a roller press or the like, thereby the cathode active material layer 21B is formed to form the cathode 21.

Next, for example, the anode active material, the electrical conductor and the binder are mixed to form an anode mixture, and then the anode mixture is dispersed in a solvent such as N-methyl-2-pyrrolidone to form paste-form anode mixture slurry. After the anode mixture slurry is uniformly applied to the anode current collector 22A through the use of a doctor blade, a bar coater or the like, and the solvent is dried, the anode mixture slurry is compression molded by a roller press, thereby the anode active material layer 22B is formed to form the anode 22. The roller press may be heated to be used. Moreover, the anode mixture slurry may be compression molded a plurality of times until having target property values. Further, any press machine other than the roller press may be used.

Next, the cathode lead 24 is attached to the cathode current collector 21A by welding or the like, and the anode lead 25 is attached to the anode current collector 22A by welding or the like. After that, after the cathode 21 and the anode 22 are laminated with the separator 23 in between, and are spirally wound several times in a winding direction shown in FIGS. 3 and 4, they are formed into a flat shape to form the battery element 20.

On the other hand, a thin strip-shaped plate made of, for example, stainless steel is prepared, and the plate is formed into a tubular shape shown in FIG. 5 or 6 to form the short circuit member 30, and the inclined portions 30A are formed on both ends of the short circuit member 30 by tapering.

After that, the battery element 20 is contained in the battery can 11, and the short circuit member 30 is inserted into a gap between the battery element 20 and the battery can 11. Next, the insulating plate 12 is arranged on the battery element 20, and then the anode lead 25 is welded to the battery can 11, and the cathode lead 24 is welded to the bottom end of the cathode pin 15. Then, the battery cover 13 is fixed in the opened end of the battery can 11 by laser welding. After that, the electrolyte solution is injected into the battery can 11 from the electrolyte solution injection hole 19 to impregnate the separator 23 with the electrolyte solution, and then the electrolyte solution injection hole 19 is filled with the sealing member 19A. Thereby, the secondary battery shown in FIGS. 1 and 2 is completed.

Figure 7:
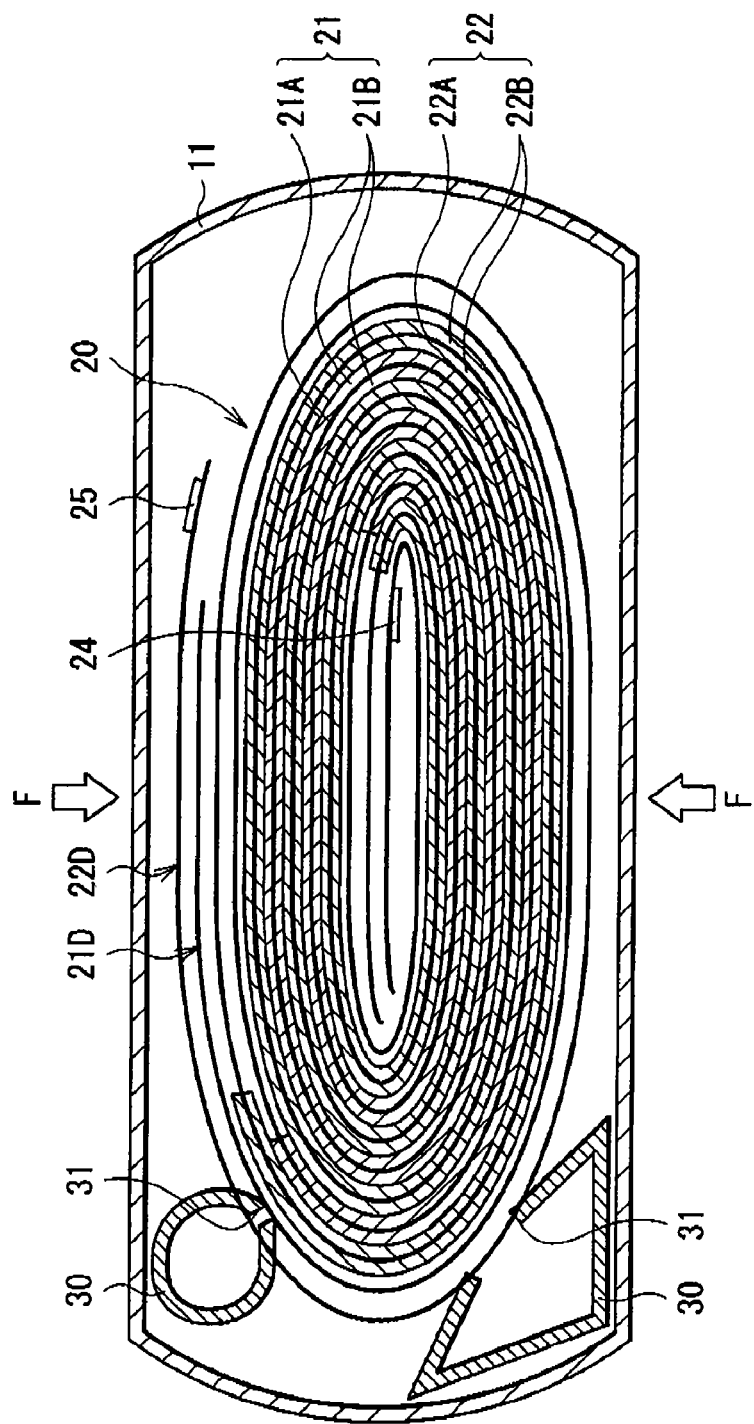
FIG. 7 is a sectional view for describing a function of the short circuit member in the case where the secondary battery shown in FIG. 1 is crushed.

When the secondary battery is charged, for example, lithium ions are extracted from the cathode 21, and are inserted into the anode 22 through the electrolyte solution with which the separator 23 is impregnated. When the secondary battery is discharged, for example, the lithium ions are extracted from the anode 22 and are inserted into the cathode 21 through the electrolyte solution with which the separator 23 is impregnated. In the secondary battery, the conductive short circuit member 30 is arranged in a gap between the battery element 20 and the battery can 11, so in the case where the battery can 11 is deformed by the application of an external force, the short circuit member 30 is crushed or bent, and as shown in FIG. 7, the slit 31 bites into the battery element 20 and penetrates the separator 23, thereby the cathode 21 and the anode 22 are reliably short-circuited.

Moreover, in the secondary battery, the cathode exposed region 21D in which the cathode active material layer 21B does not exist on both surfaces of the cathode current collector 21A is disposed on the outer side of the wound cathode 21, and the anode exposed region 22D in which the anode active material layer 22B does not exist on both surfaces of the anode current collector 22A is disposed on the outer side of the wound anode 22, so when the short circuit member 30 bites into the battery element 20, and penetrates the separator 23, the cathode current collector 21A with a relatively low resistance and the anode current collector 22A with a relatively low resistance are directly short-circuited. In other words, in the embodiment, the cathode exposed region 21D of the cathode 21 and the anode exposed region 22D of the anode 22 are short-circuited by the short circuit member 30, and a short circuit is not established by the cathode active material layer 21B with a high resistance, so an increase in temperature in the cathode active material layer 21B is prevented.

Thus, in the embodiment, the short circuit member 30 is arranged in a gap between the battery element 20 and the battery can 11, so in the case where the battery can 11 is deformed by the application of an external force, the short circuit member 30 bites into the battery element 20, thereby the cathode 21 and the anode 22 can be reliably short-circuited. In particular, the embodiment is suitable for a prismatic battery in which it is difficult to use a cylindrical center pin or a large size battery with a high heating value, and high safety can be obtained.

Moreover, specifically on the outer side of the battery element 20, the cathode exposed region 21D in which the cathode active material layer 21B does not exist on both surfaces in the cathode 21 and the anode exposed region 22D in which the anode active material layer 22B does not exist on both surfaces on the anode 22 are disposed, so when the short circuit member 30 penetrates the separator 23, the cathode current collector 21A with a relatively low resistance and the anode current collector 22A with a relatively low resistance are directly short-circuited. Therefore, while an increase in the temperature in the cathode active material layer 21B is prevented, the cathode 21 and the anode 22 can be reliably short-circuited, and the safety can be improved.

In particular, in the case where the anode 22 can insert and extract an electrode reactant, and includes an anode active material including at least one kind selected from metal elements and metalloid elements as an element, the energy density of the battery is large, and higher safety is desired, so a higher effect can be obtained.

Figure 8:
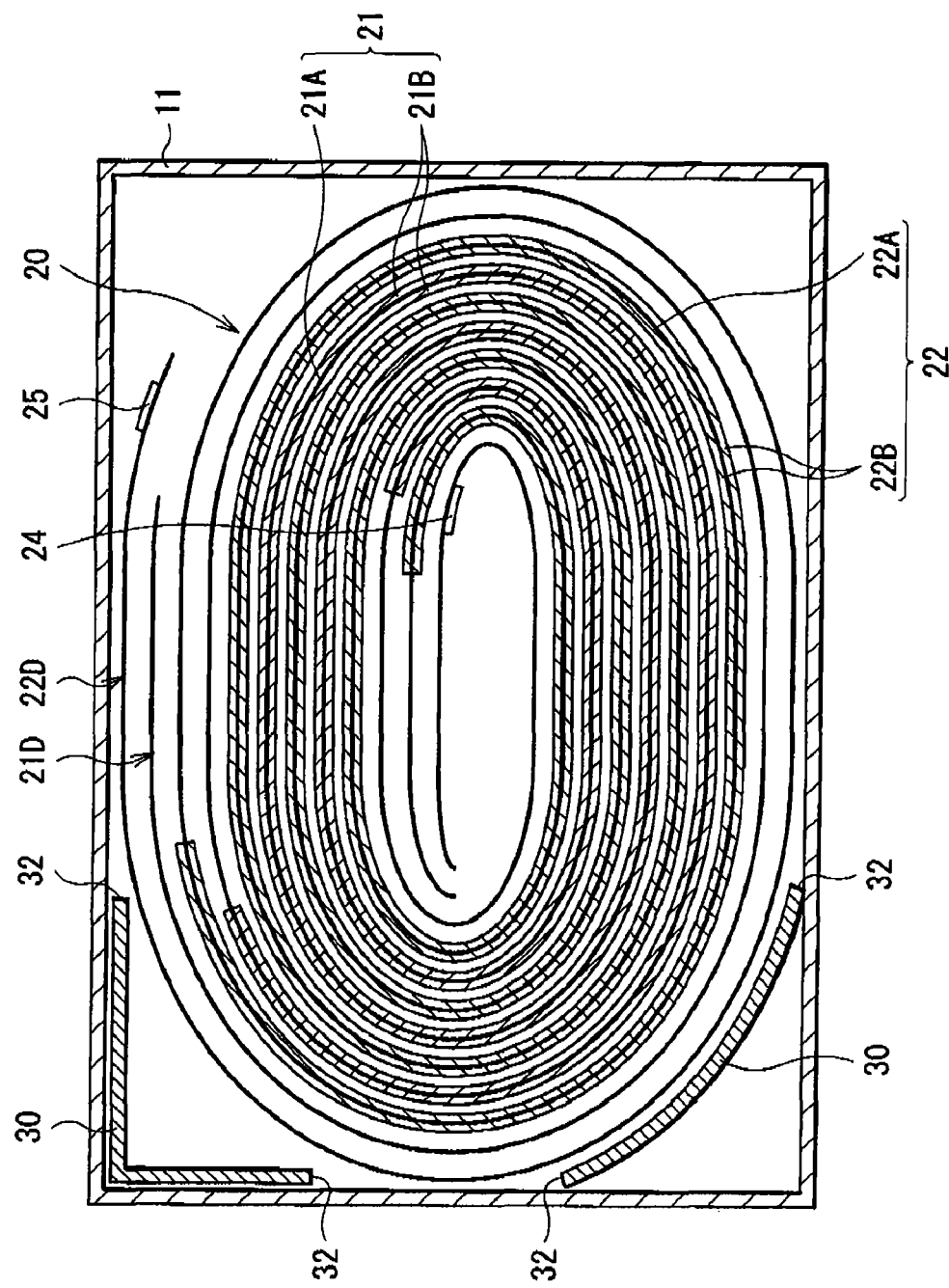
FIG. 8 is a sectional view of the structure of a secondary battery according to a second embodiment.

FIG. 8 shows a sectional view of a secondary battery according to a second embodiment of the invention. The secondary battery has the same structure as that of the first embodiment, except that the short circuit member 30 has a plate shape. Therefore, like components are denoted by like numerals as of the first embodiment.

The short circuit member 30 is preferably arranged along the inner wall of the battery can 11 or the periphery of the battery element 20.

The secondary battery can be manufactured as in the case of the first embodiment, except that after the battery element 20 is contained in the battery can 11, the plate-shaped short circuit member 30 formed into a shape along the inner wall of the battery can 11 or the periphery of the battery element 20 in advance is inserted into a gap between the battery element 20 and the battery can 11.

Moreover, the secondary battery can be manufactured by arranging the plate-shaped short circuit member 30 formed into a shape along the inner wall of the battery can 11 and the periphery of the battery element 20 on the inner wall of the battery can 11 or the periphery of the battery element 20, and then containing the battery element 20 in the battery can 11.

In the secondary battery, in the case where the battery can 11 is deformed by the application of an external force, the plate-shaped short circuit member 30 is crushed or bent, and an end edge 32 bites into the battery element 20, and penetrates the separator 23, thereby the cathode 21 and the anode 22 are reliably short-circuited.

Thus, in the embodiment, the short circuit member 30 has a plate shape, so as in the case of the first embodiment, the cathode 21 and the anode 22 can be reliably short-circuited, and the safety can be improved.

Figure 9:
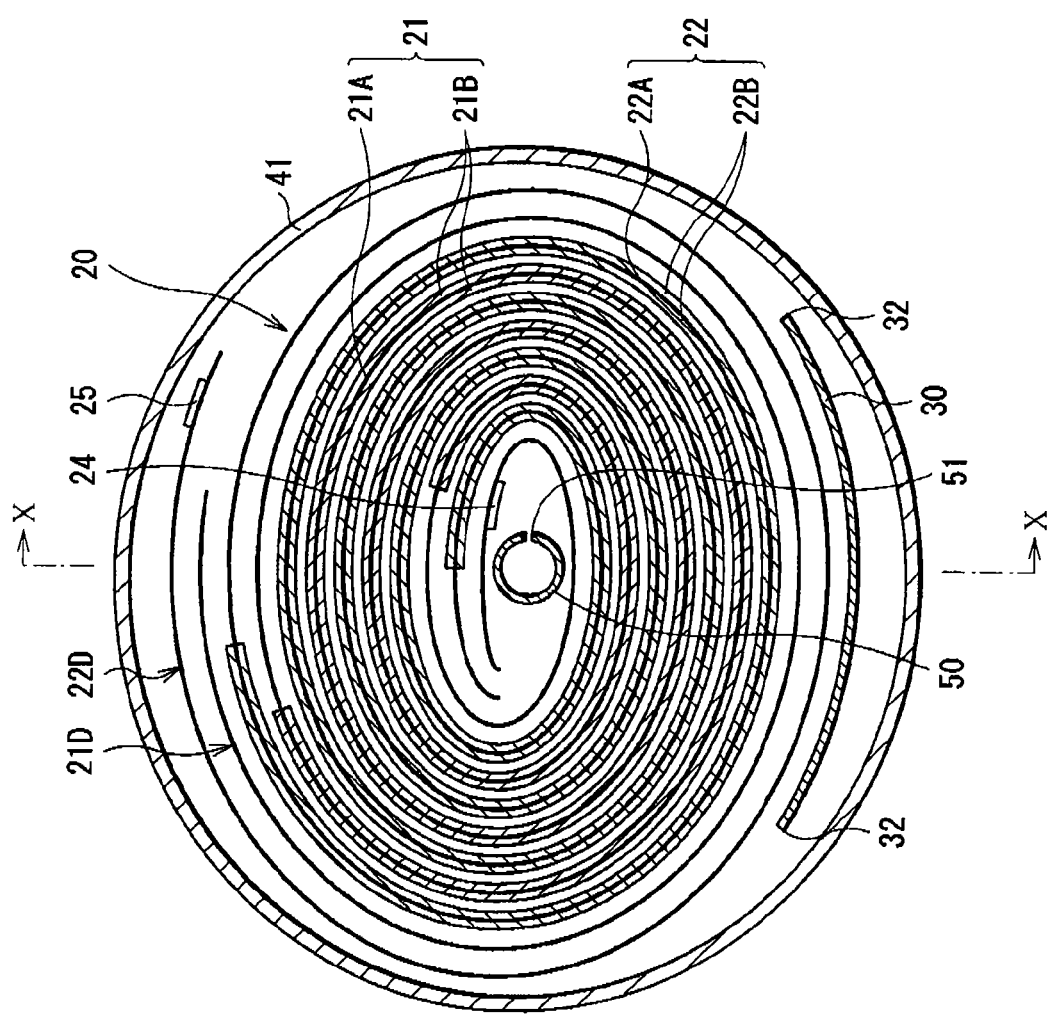
FIG. 9 is a sectional view of the structure of a secondary battery according to Modification 1.
Figure 10:
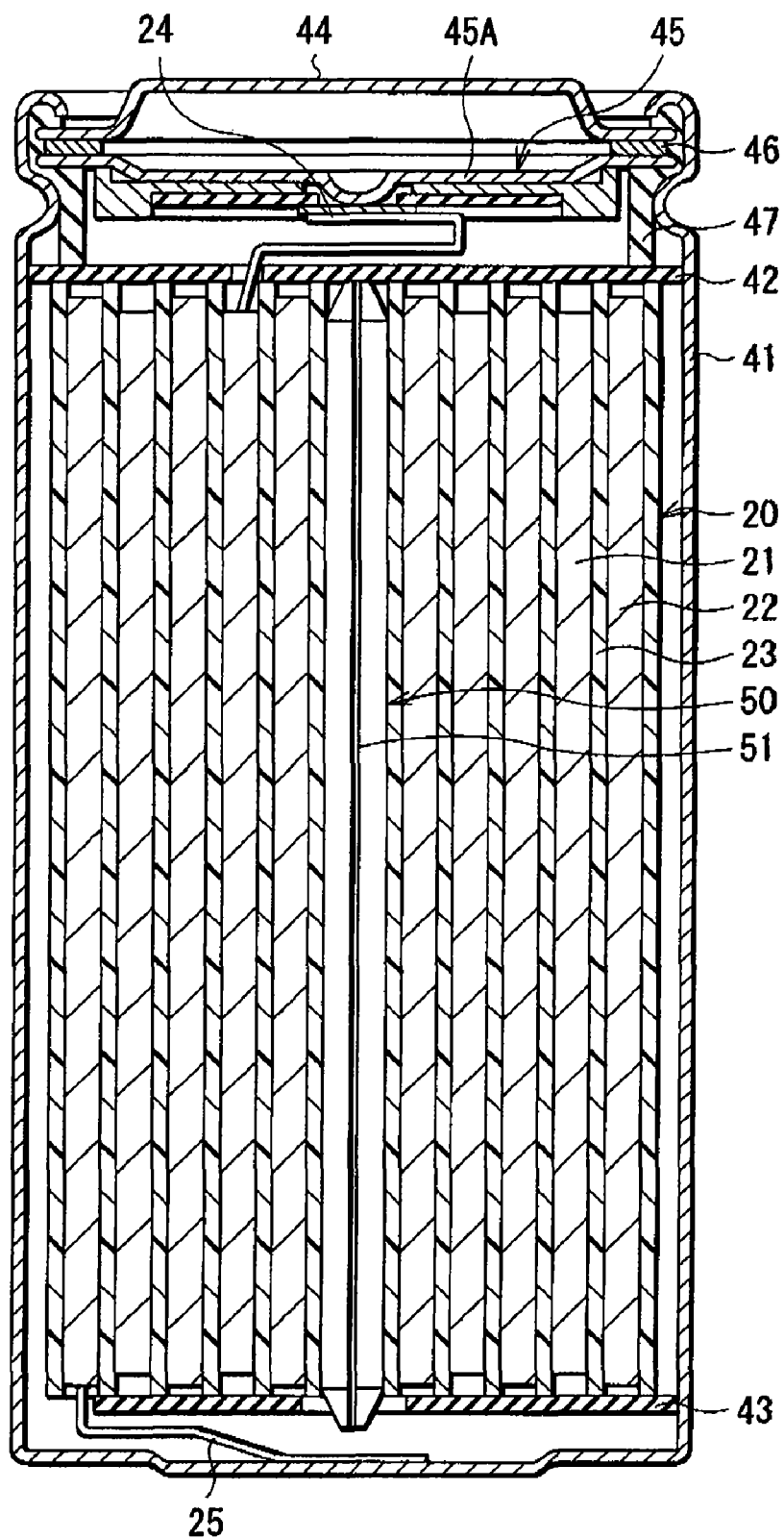
FIG. 10 is a sectional view taken along a line X-X of FIG. 9.

FIGS. 9 and 10 show sectional views of a secondary battery according to Modification 1 of the second embodiment. The secondary battery has the same structure as that of the second embodiment, except that the secondary battery is a so-called elliptical battery in which the battery element 20 having an elliptic cylindrical winding structure is contained in a hollow elliptical battery can 41.

In the battery can 41, a pair of insulating plates 42 and 43 are disposed so that the battery element 20 is sandwiched therebetween in a direction perpendicular to a peripheral winding surface. In the opened end portion of the battery can 41, a battery cover 44 and, a safety valve mechanism 45 and a positive temperature coefficient device (PTC device) 46 disposed inside the battery cover 44 are mounted by caulking by a gasket 47, and the battery can 41 is sealed. The battery cover 44 is made of, for example, the same material as that of the battery can 41. The safety valve mechanism 45 is electrically connected to the battery cover 44 through the PTC device 46, and when internal pressure in the battery increases to a certain extent or higher due to an internal short circuit or external application of heat, a disk plate 45A is flipped so as to disconnect the electrical connection between the battery cover 44 and the battery element 20. When a temperature rises, the PTC device 46 limits a current by an increased resistance, thereby resulting in preventing abnormal heat generation by a large current. The gasket 47 is made of, for example, an insulating material, and its surface is coated with asphalt.

The short circuit member 30 has a plate shape as in the case of the second embodiment, and is arranged along the inner wall of the battery can 41 or the periphery of the battery element 20.

A center pin 50 is arranged in the center of the battery element 20. For example, the center pin 50 is formed by rolling a thin strip-shaped plate into a tubular shape as in the case of the cylindrical short circuit member 30 shown in FIG. 5, and the center pin 50 has a slit 51 from an end to the other end in a longitudinal direction. Therefore, as in the case of the short circuit member 30, in the case where the battery is crushed or bent by the application of an external force to cause the deformation of the battery can 41, the slit 51 can open out to bite into the battery element 20, thereby the safety can be further improved.

The secondary battery can be manufactured by the following steps, for example.

At first, as in the case of the first embodiment, the battery element 20 is formed. Next, a thin strip-shaped plate made of, for example, stainless steel is prepared, and the plate is rolled into a tubular shape so as to form a tubular center pin 50, and the center pin 50 is inserted into the center of the battery element 20.

Next, the battery element 20 is sandwiched between a pair of insulating plates 42 and 43, and the anode lead 25 is welded to the battery can 41, and the cathode lead 24 is welded to the safety valve mechanism 45, and then the battery element 20 is contained in the battery can 41. After that, the plate-shaped short circuit member 30 formed into a shape along the inner wall of the battery can 41 or the periphery of the battery element 20 in advance is inserted into a gap between the battery element 20 and the battery can 41.

After the short circuit member 30 is inserted, the electrolyte solution is injected into the battery can 41 to impregnate the separator 23 with the electrolyte solution. Finally, the battery cover 44, the safety valve mechanism 45 and the PTC device 46 are fixed in the opened end of the battery can 41 by caulking by the gasket 47. Thereby, the secondary battery shown in FIGS. 9 and 10 is completed.

Moreover, the secondary battery can be manufactured by arranging the plate-shaped short circuit member 30 formed into a shape along the inner wall of the battery can 41 or the periphery of the battery element 20 in advance on the inner wall of the battery can 41 or the periphery of the battery element 20, and then containing the battery element 20 in the battery can 41.

In the secondary battery, in the case where the battery can 41 is deformed by the application of an external force, the plate-shaped short circuit member 30 is crushed or bent so that the end edge 32 of the short circuit member 30 bites into the battery element 20 and penetrates the separator 23, thereby the cathode 21 and the anode 22 are reliably short-circuited. Moreover, the center pin 50 is arranged in the center of the battery element 20, so the center pin 50 is also crushed or bent, and the slit 51 opens out to bite into the battery element 20 and penetrate the separator 23, thereby the cathode 21 and the anode 22 are short-circuited.

Thus, in the modification, the plate-shaped short circuit member 30 is arranged along the inner wall of the hollow elliptical battery can 41 or the periphery of the battery element 20, so as in the case of the second embodiment, the cathode 21 and the anode 22 can be reliably short-circuited, and the safety can be improved.

Moreover, the center pin 50 is arranged in the center of the battery element 20, so the safety can be further improved.

Figure 11:
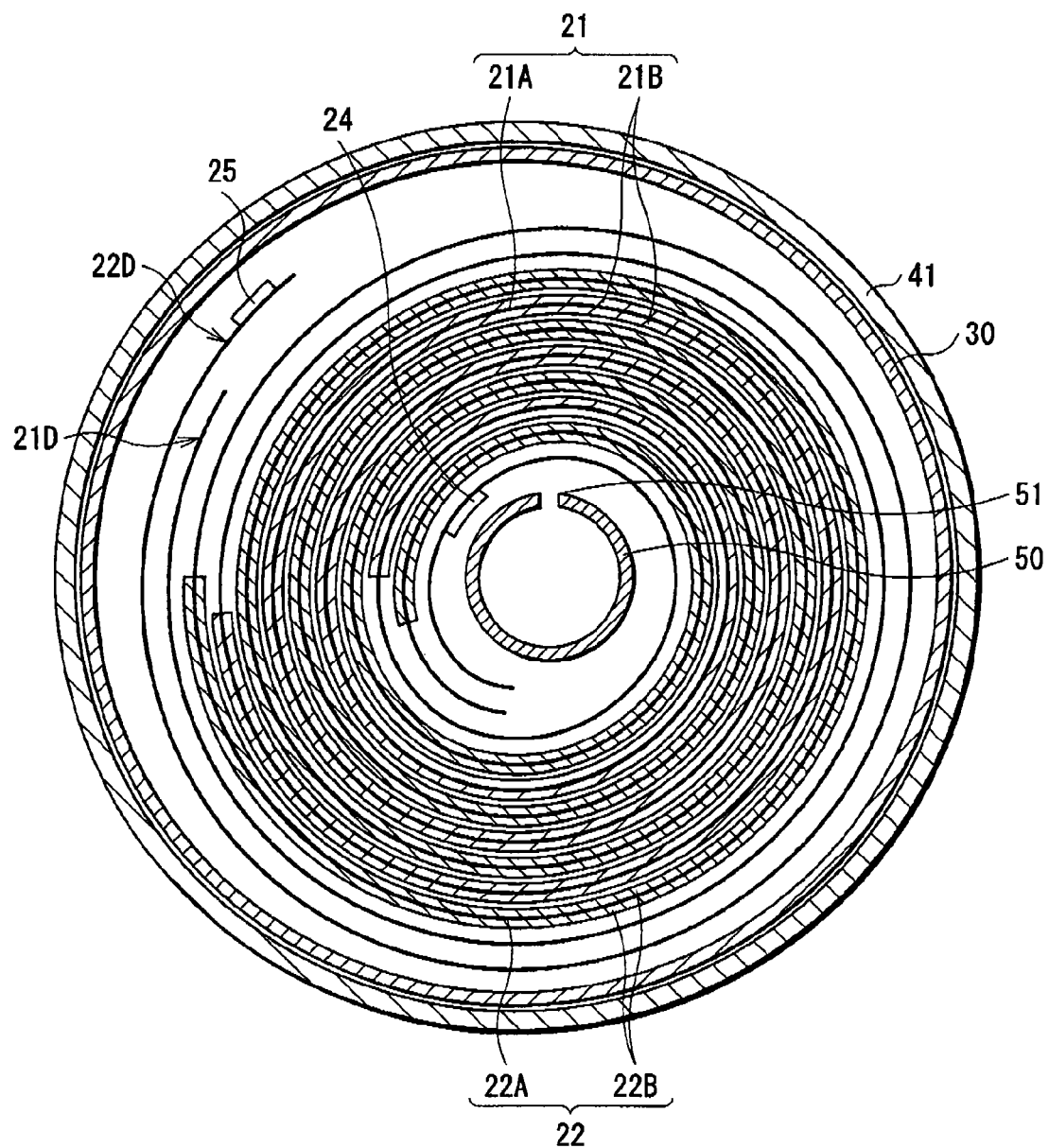
FIG. 11 is a sectional view of the structure of a secondary battery according to Modification 2.

FIG. 11 shows a sectional view of a secondary battery according to Modification 2 of the second embodiment. The secondary battery has the same structure as that of Modification 1 and can be manufactured as in the case of Modification 1, except that the secondary battery is a so-called cylindrical battery in which the battery element 20 with a cylindrical winding structure is contained in the hollow cylindrical battery can 41. The functions and the effects are the same as those in Modification 1.

The plate-shaped short circuit member 30 is not necessarily arranged along the whole periphery of the battery element 20.

Figure 12:
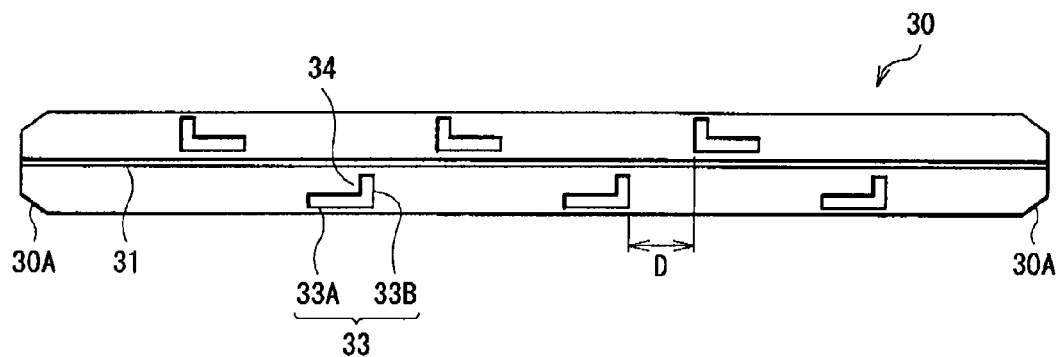
FIG. 12 is a plan view of the structure of a short circuit member of a secondary battery according to a third embodiment.

FIG. 12 shows the structure of the short circuit member 30 of a secondary battery according to a third embodiment of the invention. The secondary battery has the same structure as that of the first embodiment, except that a bending-shaped cut 33 is disposed in the short circuit member 30. Therefore, like components are denoted by like numerals as of the first embodiment.

The cut 33 includes two linear portions 33A and 33B, and the linear portion 33B extends from an end of the linear portion 33A in a direction different from the direction of the linear portion 33A, for example, in a perpendicular direction. In other words, the cut 33 has the so-called shape of the letter L, and as a result, a projection portion 34 is formed. Thereby, in the secondary battery, in the case where the secondary battery is crushed by an external force, the projection portion 34 bites into the battery element 20, and penetrates the separator 23, thereby the cathode 21 and the anode 22 can be short-circuited more reliably. The corners of the cut 33 are not necessarily at a right angle, and may be rounded.

The lengths of the linear portions 33A and 33B, that is, the dimensions in an extending direction are preferably set to an extent that the projection portion 34 on the cut 33 can be reliably projected, for example, approximately halfway around the short circuit member 30. For example, the widths of the linear portions 33A and 33B, that is, the dimensions in a direction perpendicular to the extending direction is preferably 0.1 mm to 2.0 mm inclusive, because a higher effect can be obtained. The lengths of the linear portions 33A and 33B are not necessarily the same.

It is preferable that the linear portion 33A is parallel to the longitudinal direction of the short circuit member 30, and the linear portion 33B extends in a perpendicular direction from the end of the linear portion 33A, because productivity can be improved.

A distance D between such cuts 33 is preferably 0.1 mm or over, because productivity can be improved.

Figure 13:
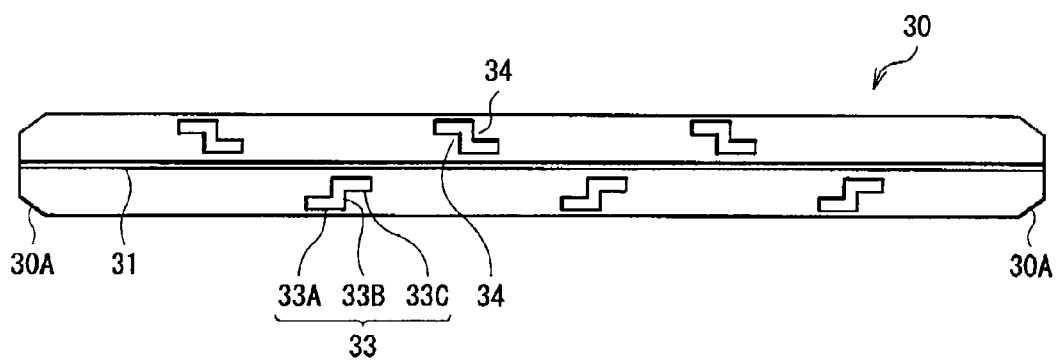
FIG. 13 is a plan view of another structural example of the short circuit member.

Moreover, for example, as shown in FIG. 13, the cut 33 includes three linear portions 33A, 33B and 33C, and may have a shape (hereinafter referred to as Z type) in which the linear portion 33B extends from an end of the linear portion 33A in a direction different from the direction of the linear portion 33A, and the linear portion 33C extends from an end of the linear portion 33B in a direction different from the direction of the linear portion 33B. Angles where the linear portions 33A, 33B and 33C form are preferably a right angle, because productivity can be improved.

Figure 14:
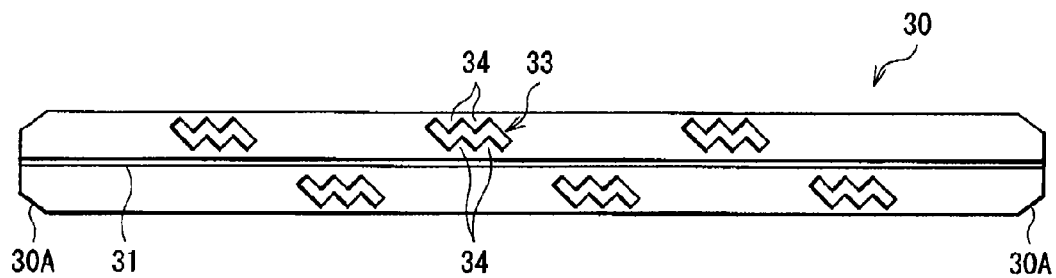
FIG. 14 is a plan view of still another structural example of the short circuit member.

In addition, for example, as shown in FIG. 14, the cut 33 includes a large number of linear portions, and may have a shape (hereinafter referred to as wave type) in which one of the linear portions extends from an end of another linear portion in a direction different from another linear portion. Such a wave type cut 33 is preferable, because the cut 33 can easily establish a short circuit between electrodes, compared to a linear cut, the L type cut or the Z shape cut. In the case where the linear portions constituting the cut 33 are provided obliquely with respect to the longitudinal direction of the short circuit member 30, a straight line between an end and the other end of the cut 33 is preferably substantially parallel or perpendicular to the longitudinal direction of the short circuit member 30.

The secondary battery can be manufactured as in the case of the first embodiment, except that the cuts 33 are provided in a plate with which the short circuit member 30 is formed, and then the plate is rolled to form the short circuit member 30.

In the secondary battery, in the case where an external force is applied to the secondary battery, the short circuit member 30 is crushed, and the projection portion 34 on the cut 33 bites into the battery element 20, and penetrates the separator 23, thereby the cathode 21 and the anode 22 are short-circuited more reliably.

Thus, in the embodiment, the cuts 33 are provided in the short circuit member 30, so in the case where the short circuit member 30 is crushed or bent by an external force, the cathode 21 and the anode 22 can be short-circuited more reliably, and safety can be improved.

Figure 15:
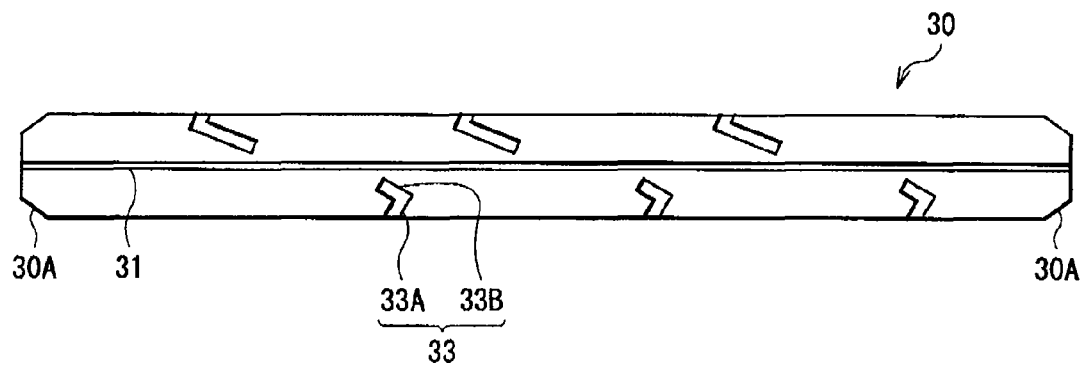
FIG. 15 is a plan view of a further structural example of the short circuit member.

In the embodiment, the case where the cuts 33 are provided at regular intervals is described; however, the cuts 33 may be provided at irregular intervals. Moreover, in the embodiment, the case where the linear portion 33A is parallel to the longitudinal direction of the short circuit member 30, and the linear portion 33B is perpendicular to the linear portion 33A is described; however, as shown in FIG. 15, the linear portions 33A and 33B may be arranged obliquely with respect to the longitudinal direction of the short circuit member 30.

Figure 16:
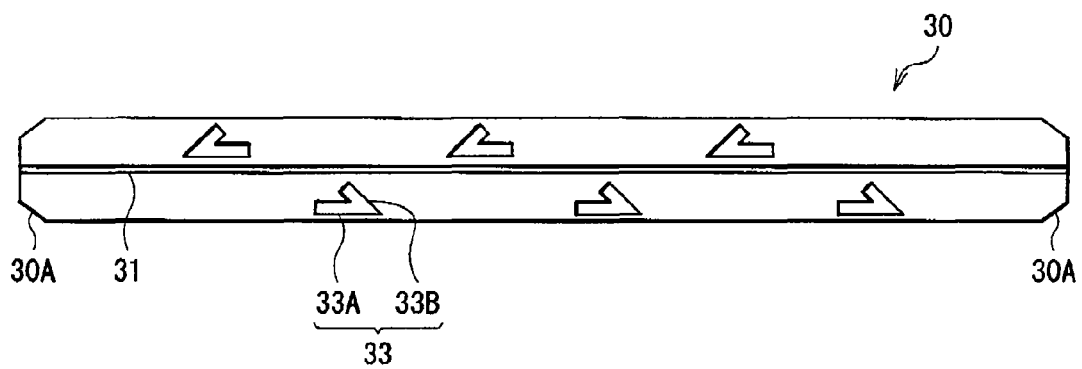
FIG. 16 is a plan view of a further structural example of the short circuit member.

Moreover, in the embodiment, the case where the linear portion 33B extends in a direction perpendicular from the end of the linear portion 33A is described; however, as shown in FIG. 16, the linear portion 33B may extend in an acute direction from the end of the linear portion 33A. Further, the linear portion 33B may extend in an acute direction from the end of the linear portion 33A, and the linear portion 33A and the linear portion 33B may be arranged obliquely with respect to the longitudinal direction of the short circuit member 30.

Figure 17:
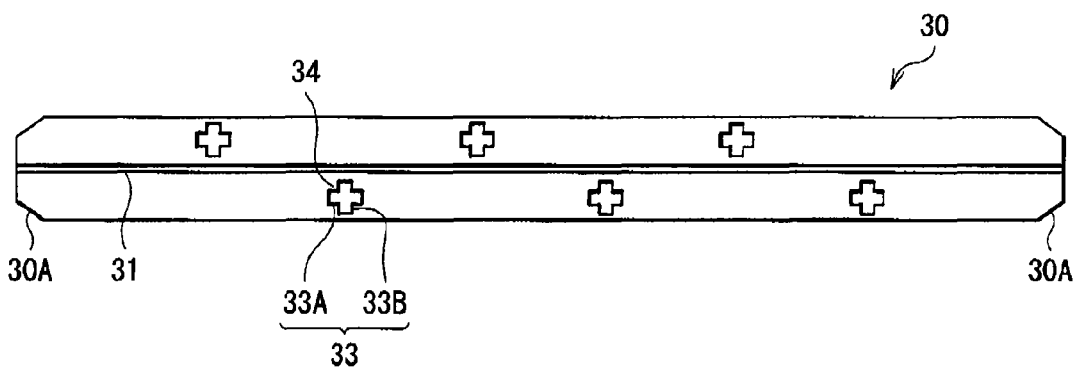
FIG. 17 is a plan view of a further structural example of the short circuit member.
Figure 18:
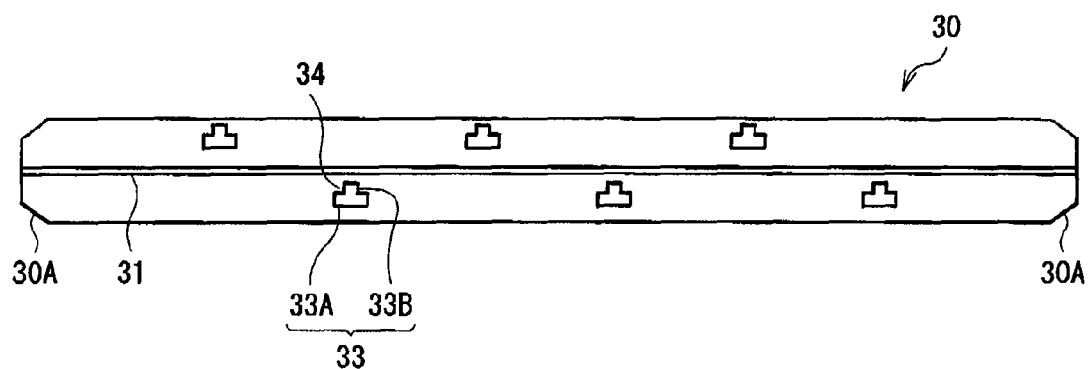
FIG. 18 is a plan view of a further structural example of the short circuit member.

In addition, the linear portion 33A and the linear portion 33B in the cut 33 may intersect each other. At this time, the linear portion 33B may intersect the linear portion 33A in a cross shape as shown in FIG. 17 or in the shape of the letter T as shown in FIG. 18. Further, the intersecting angle between the linear portion 33A and the linear portion 33B is not necessarily a right angle, and it may be an acute angle or an obtuse angle.

Figure 19:
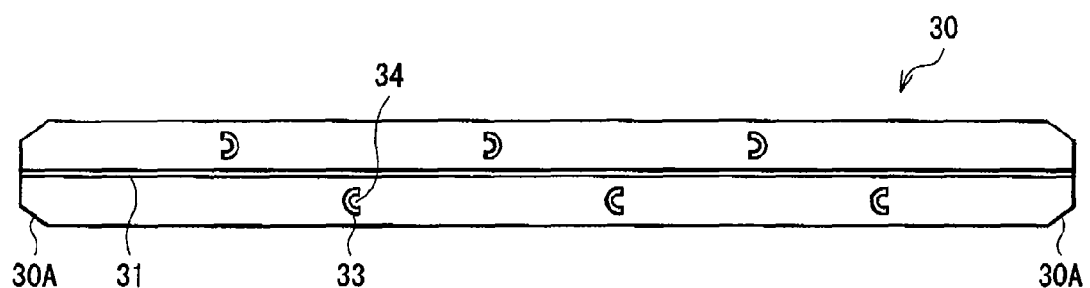
FIG. 19 is a plan view of a further structural example of the short circuit member.

Further, the shape of the cut 33 is not necessarily limited to a linear shape, and for example, the cut 33 may have a curved shape as shown in FIG. 19.

Figure 20:
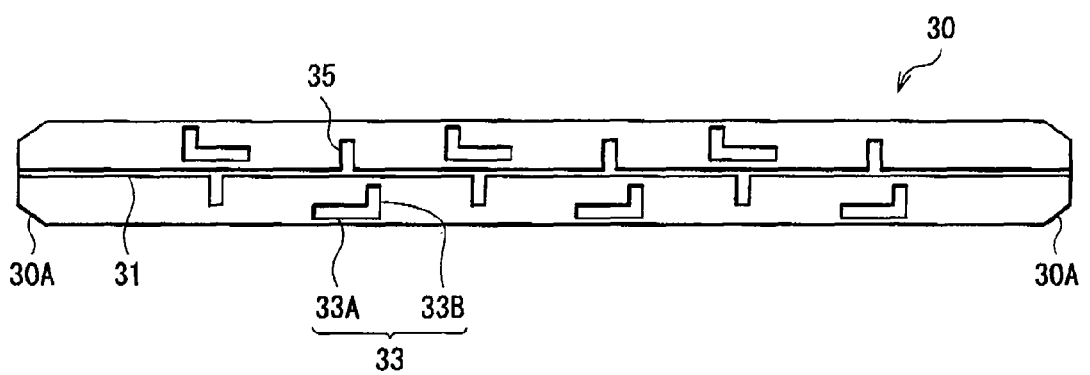
FIG. 20 is a plan view of a further structural example of the short circuit member.
Figure 21:
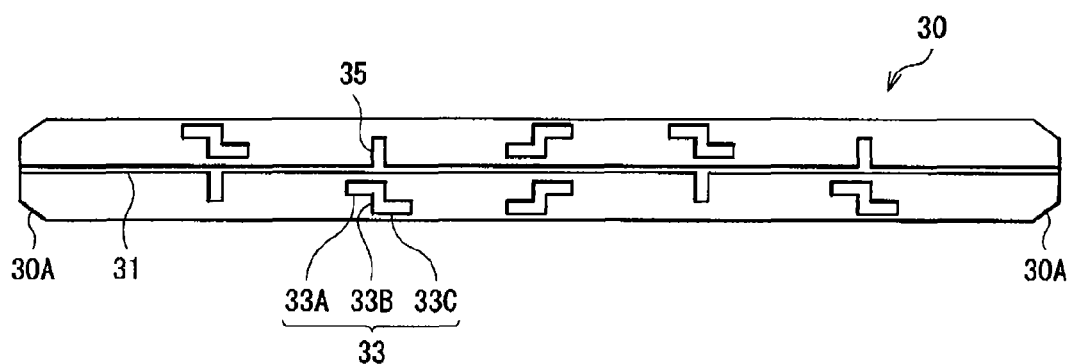
FIG. 21 is a plan view of a further structural example of the short circuit member.
Figure 22:
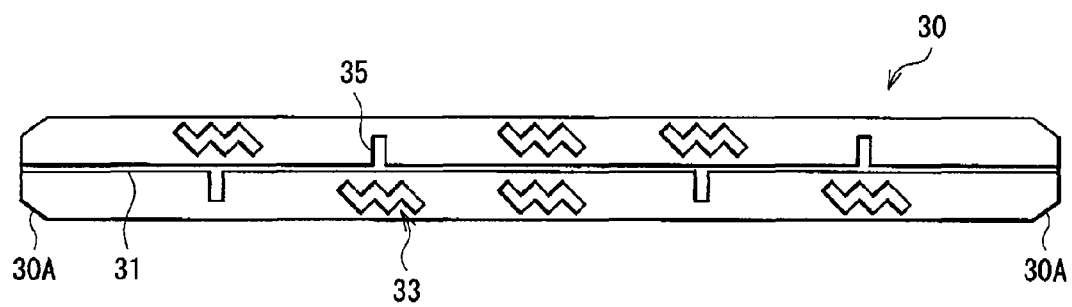
FIG. 22 is a plan view of a further structural example of the short circuit member.

In addition, in the center pin 30, in addition to the cut 33 shown in FIG. 12, 13 or 14, a notch 35 intersecting the slit 31 may be provided as shown in FIGS. 20, 21 and 22. As in the case of the projection portion 34 on the cut 33, the cathode 21 and the anode 22 can be short-circuited more reliably by a corner formed in a intersecting portion between the notch 35 and the slit 31, and safety can be further improved.

Figure 23:
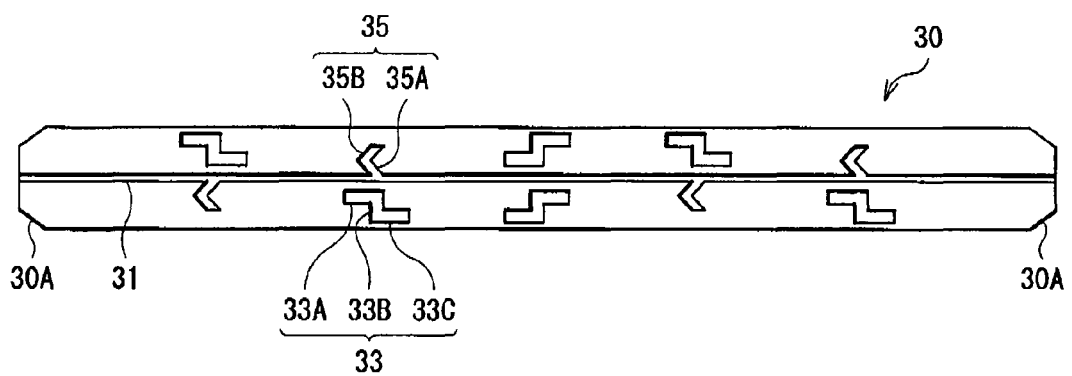
FIG. 23 is a plan view of a further structural example of the short circuit member.

The shape of the notch 35 is not limited to a linear shape, and may have a bending shape such as the L type as in the case of the cut 33 as shown in FIG. 23. More specifically, the notch 35 may include two linear portions 35A and 35B, and have a shape in which the linear portion 35B extends in a direction different from the direction of the linear portion 35A from an end of the linear portion 35A.

The position of the notch 35 is not specifically limited, and the notch 35 and the cut 33 do not necessarily face each other with the slit 31 in between. In this case, the notch 35 may be provided on both sides of the slit 31.

Figure 24:
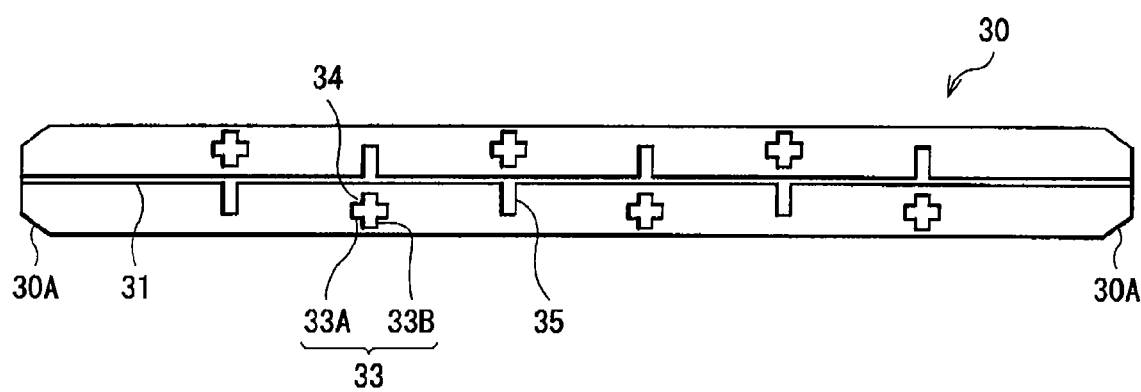
FIG. 24 is a plan view of a further structural example of the short circuit member.

The shape of the cut 33 used together with the notch 35 is not specifically limited, and the cut 33 with another shape described in the modification of the third embodiment may be provided. For example, as shown in FIG. 24, the cut 33 with a cross shape shown in FIG. 17 may be provided.

The intersecting angle of the notch 35 with respect to the slit 31 is not specifically limited, and may intersect the slit 31 diagonally with respect to the slit 31.

Figure 25:
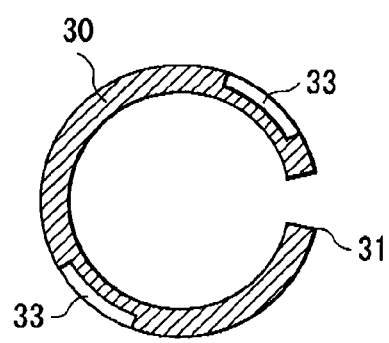
FIG. 25 is a sectional view of a further structural example of the short circuit member.

Further, the cut 33 is not necessarily a through hole in the thickness direction of the center pin 30, and as shown in FIG. 25, the cut 33 may be a shallow groove formed by removing a portion of the center pin 30 in a thickness direction without penetrating so that the thickness of the portion is thinner than the thickness of a peripheral portion. The notch 35 may be formed in the same manner.

In the third embodiment and the modification of the third embodiment, the cylindrical short circuit member 30 as shown in FIG. 5 is described as an example; however, the third embodiment and the modification thereof can be applied to the short circuit member 30 with a polygonal section as shown in FIG. 6. Moreover, as shown in FIGS. 26 through 32, the cut 33 or the notch 35 may be provided in the plate-shaped short circuit member 30 described in the second embodiment.

Specific examples of the invention will be described in detail below.

EXAMPLES 1, 2-1 TO 2-3

Secondary batteries described in the first embodiment and the third embodiment were formed. At first, lithium carbonate ($Li_2CO_3$) and cobalt carbonate ($CoCO_3$) were mixed at a molar ratio of $Li_2CO_3:CoCO_3=0.5:1$ to form a mixture, and the mixture was fired for 5 hours at 900° C. in air to obtain lithium-cobalt complex oxide ($LiCoO_2$) as a cathode active material. Next, 91 parts by weight of lithium-cobalt complex oxide, 6 parts by weight of graphite as an electrical conductor and 3 parts by weight of polyvinylidene fluoride were mixed to form a cathode mixture. Then, the cathode mixture was dispersed in N-methyl-2-pyrrolidone as a solvent to form cathode mixture slurry, and after the cathode mixture slurry was uniformly applied to both surfaces of the cathode current collector 21A made of aluminum foil with a thickness of 20

μm, and was dried, the cathode mixture slurry was compression molded by a roller press to form the cathode active material layer 21B, thereby the cathode 21 was formed. Next, the cathode lead 24 made of aluminum was attached to an end of the cathode current collector 21A.

Moreover, a CoSnC-containing material was formed as the anode active material. At first, cobalt powder, tin powder and carbon powder were prepared as materials, and the cobalt powder and the tin powder were alloyed to form cobalt-tin alloy powder, and then the carbon powder was added into the alloy powder, and they were dry mixed to form a mixture. Next, the mixture was subjected to a mechanochemical reaction through the use of a planetary ball mill to synthesize the CoSnC-containing material.

When the composition of the obtained CoSnC-containing material was analyzed, the cobalt content was 29.3 wt %, the tin content was 49.9 wt % and the carbon content was 19.8 wt %. The carbon content was measured by a carbon/sulfur analyzer, and the contents of cobalt and tin were measured by ICP (Inductively Coupled Plasma) emission spectrometry. Moreover, when X-ray diffraction was performed on the obtained CoSnC-containing material, a diffraction peak having a broad half-width in which the diffraction angle $2\theta$ was 1.0° or over was observed within a range of the diffraction angle $2\theta=20°$ to 50°. Further, when XPS was performed on the obtained CoSnC-containing material, the peak of C1s was obtained in a region lower than 284.5 eV. In other words, it was confirmed that carbon included in the CoSnC-containing material was bonded to another element.

Next, 60 parts by weight of the CoSnC-containing material, 28 parts by weight of artificial graphite and 2 parts by weight of carbon black as electrical conductors and the anode active materials, and 10 parts by weight of polyvinylidene fluoride as a binder were mixed to form a mixture, and the mixture was dispersed in N-methyl-2-pyrrolidone as a solvent to form anode mixture slurry. Next, the anode mixture slurry was uniformly applied to both surfaces of the anode current collector 22A made of copper foil with a thickness of 15 μm, and the anode mixture slurry was dried and compression molded by a roller press to form the anode active material layer 22B. After that, the anode lead 25 made of nickel was attached to an end of the anode current collector 22A.

Next, the separator 23 made of a microporous polypropylene film with a thickness of 25 μm was prepared, and the cathode 21, the separator 23, the anode 22 and the separator 23 were laminated in this order to form a laminate, and then the laminate was spirally wound several times to form the battery element 20.

After that, the battery element 20 was contained in the battery can 11, and the short circuit member 30 was inserted into a gap between the battery element 20 and the battery can 11. At that time, in Example 1, the short circuit member 30 formed by forming a thin strip-shaped plate made of stainless steel into a tubular shape as shown in FIGS. 5 and 6 was used. In Examples 2-1 through 2-3, the short circuit member 30 formed by providing the cut 33 or the notch 35 in a thin strip-shaped plate made of stainless steel, and then forming the plate into a tubular shape shown in FIGS. 5 and 6 was used. In Example 2-1, only the L type cut 33 was provided. In Example 2-2, the Z type cut 33 and the linear notch 35 shown in FIG. 21 were provided. In Example 2-3, the Z type cut 33 and the Z type notch 35 shown in FIG. 23 were provided.

After the short circuit member 30 was inserted, the insulating plate 12 was disposed on the battery element 20, and the anode lead 25 was welded to the battery can 11, and the cathode lead 24 was welded to the bottom end of the cathode pin 15, and the battery cover 13 was fixed in the opened end of the battery can 11 by laser welding. After that, the electrolyte solution was injected into the battery can 11 from the electrolyte solution injection hole 19. As the electrolyte solution, an electrolyte solution formed by dissolving 1 mol/l of $LiPF_6$ as an electrolyte salt in a solvent formed by mixing 50 vol % of ethylene carbonate and 50 vol % of diethyl carbonate was used. Finally, the electrolyte solution injection hole 19 was filled with the sealing member 19A, thereby the prismatic secondary batteries with a thickness of 5 mm, a width of 34 mm and a height of 42 mm were obtained.

EXAMPLE 3

A secondary battery described in the second embodiment was formed. More specifically, the secondary battery was formed as in the case of Example 1, except that as the short circuit member 30, a thin strip-shaped plate made of stainless steel was arranged along the inner wall of the battery can 11.

EXAMPLE 4

A secondary battery was formed as in the case of Example 3, except that the secondary battery was a so-called cylindrical type in which the battery element 20 having a cylindrical winding structure was contained in the cylindrical battery can 41 as shown in Modification 2. More specifically, at first, the battery element 20 was formed as in the case of Example 1. Next, a thin strip-shaped plate made of stainless steel was prepared, and was rolled into a tubular shape so as to form the tubular center pin 50, and the center pin 50 was inserted into the center of the battery element 20.

Then, the battery element 20 was sandwiched between a pair of insulating plates 42 and 43, and the anode lead 25 was welded to the battery can 41, and the cathode lead 24 was welded to the safety valve mechanism 45, and then the battery element 20 was contained in the battery can 41 with an internal diameter of 14.0 mm. After that, the plate-shaped short circuit member 30 was arranged along the inner wall of the battery can 41.

After the short circuit member 30 was arranged, the electrolyte solution was injected into the battery can 41. Finally, the battery cover 44 was caulked to the battery can 41 by the gasket 47, thereby the cylindrical secondary battery with an outside diameter of 14 mm and a height of 43 mm was obtained.

EXAMPLES 5, 6

Figure 26:
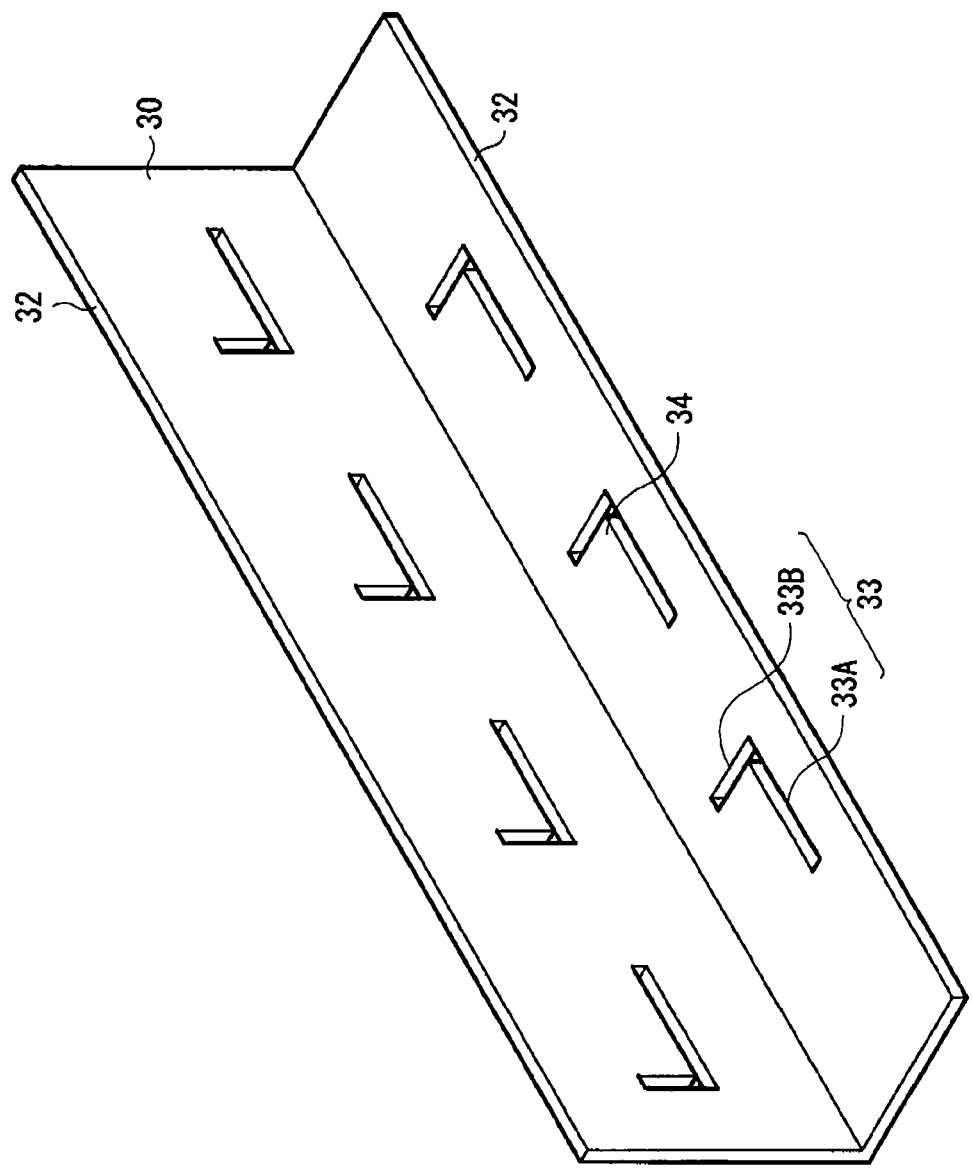
FIG. 26 is a perspective view of a further structural example of the short circuit member.
Figure 27:
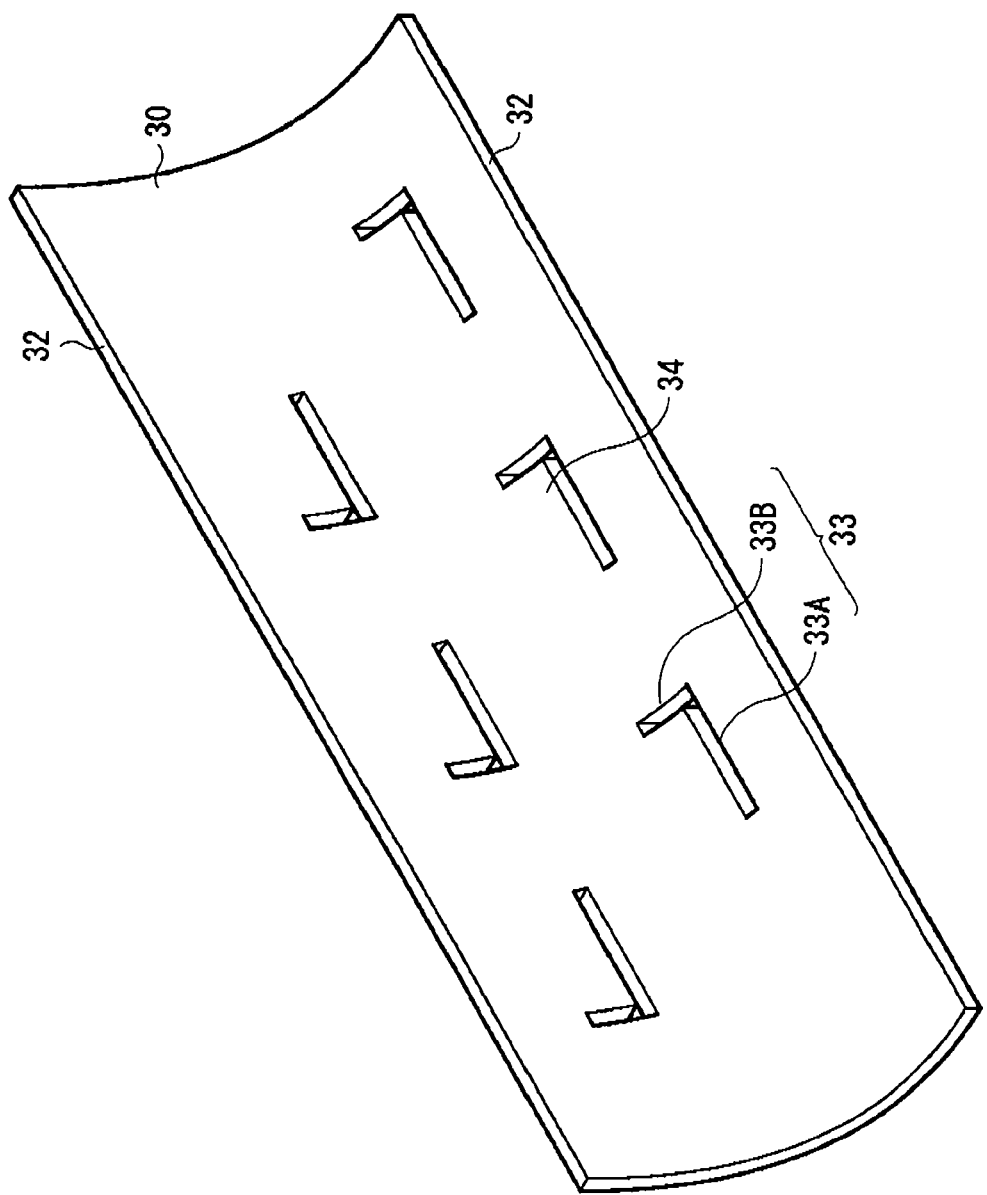
FIG. 27 is a perspective view of a further structural example of the short circuit member.
Figure 28:
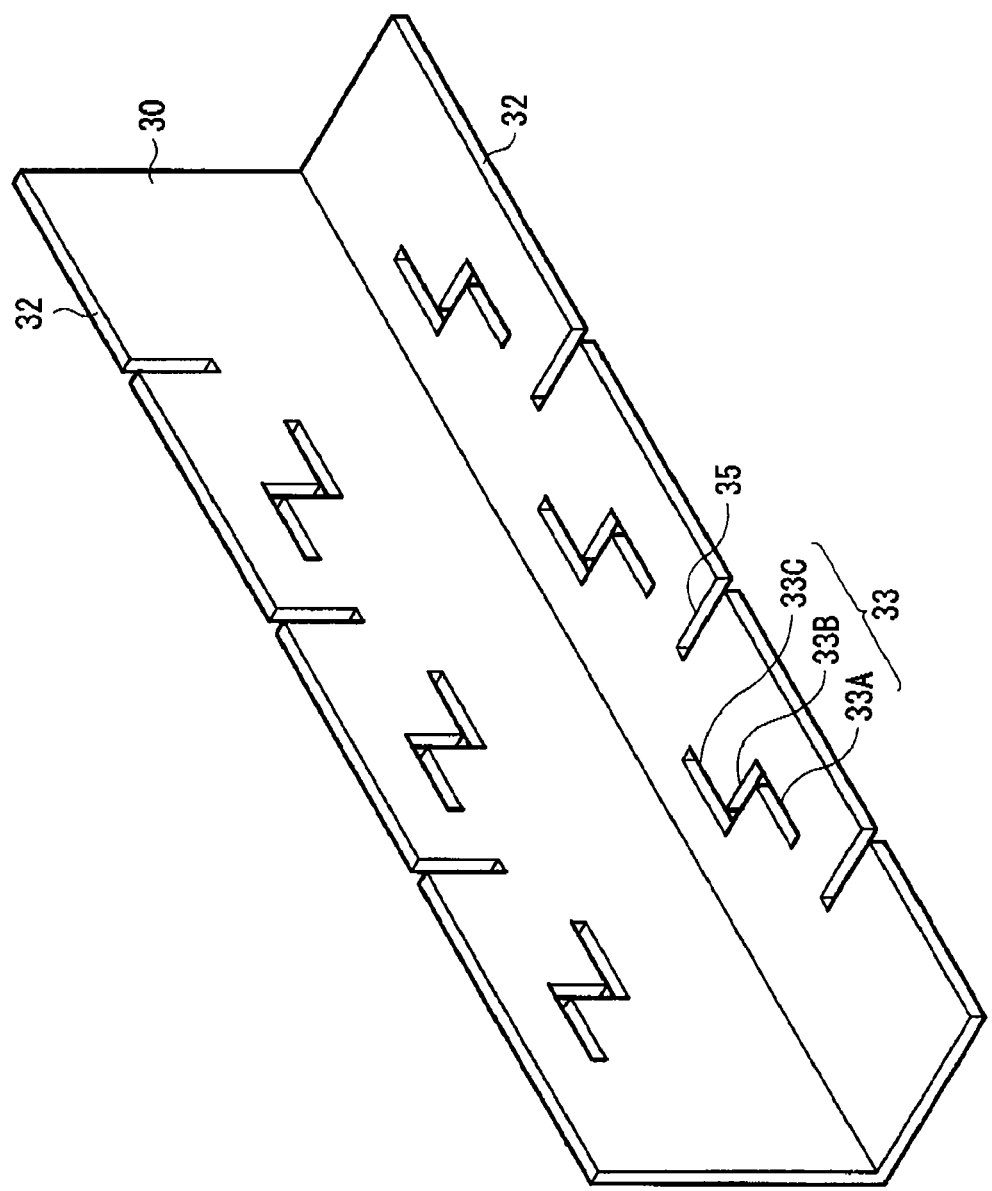
FIG. 28 is a perspective view of a further structural example of the short circuit member.

A secondary battery of Example 5 was formed as in the case of Example 3, and a secondary battery of Example 6 was formed as in the case of Example 4, except that the L type cut 33 shown in FIGS. 26 and 27 was provided in the short circuit member 30.

EXAMPLES 7, 8

A secondary battery of Example 7 was formed as in the case of Example 3, and a secondary battery of Example 8 was formed as in the case of Example 4, except that the short circuit member 30 was arranged along the periphery of the battery element 20.

EXAMPLES 9, 10

A secondary battery of Example 9 was formed as in the case of Example 7, and a secondary battery of Example 10 was formed as in the case of Example 8, except that the L type cut 33 shown in FIG. 27 was provided in the short circuit member 30.

EXAMPLES 11, 12

Figure 29:
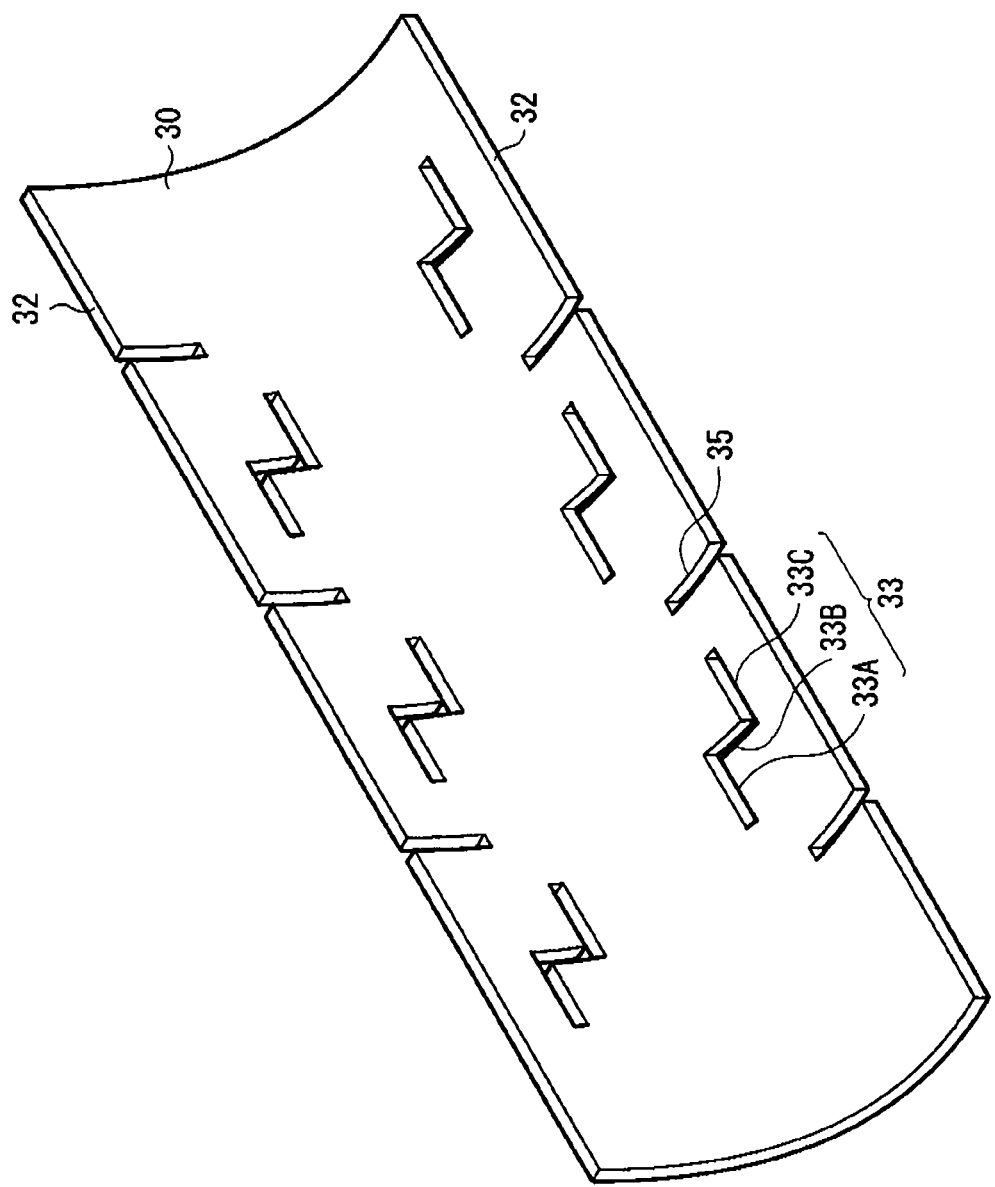
FIG. 29 is a perspective view of a further structural example of the short circuit member.
Figure 30:
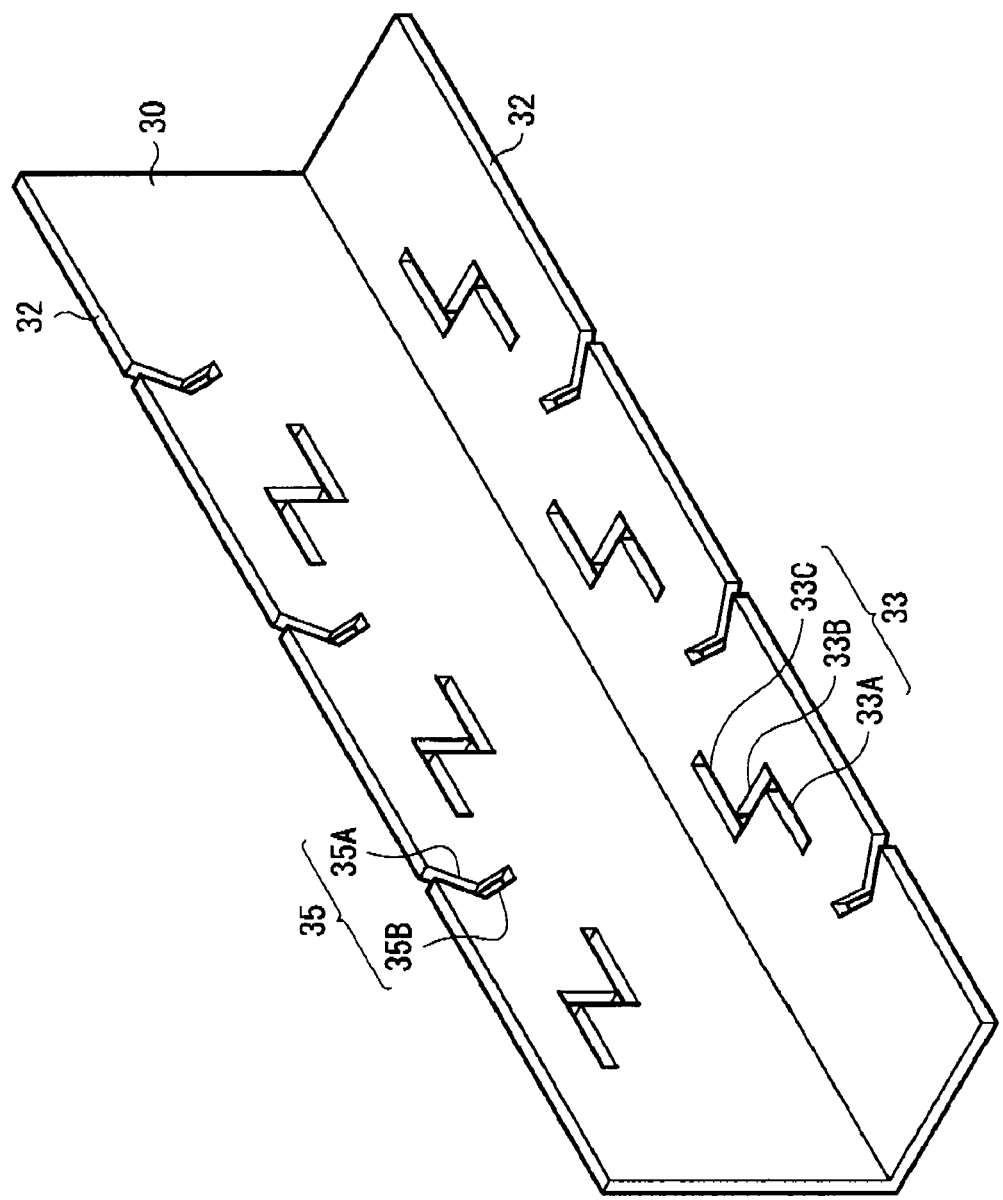
FIG. 30 is a perspective view of a further structural example of the short circuit member.

A secondary battery of Example 11 was formed as in the case of Example 7, and a secondary battery of Example 12 was formed as in the case of Example 8, except that the Z type cut 33 and the linear notch 35 shown in FIG. 29 were provided in the short circuit member 30.

EXAMPLES 13, 14

Figure 31:
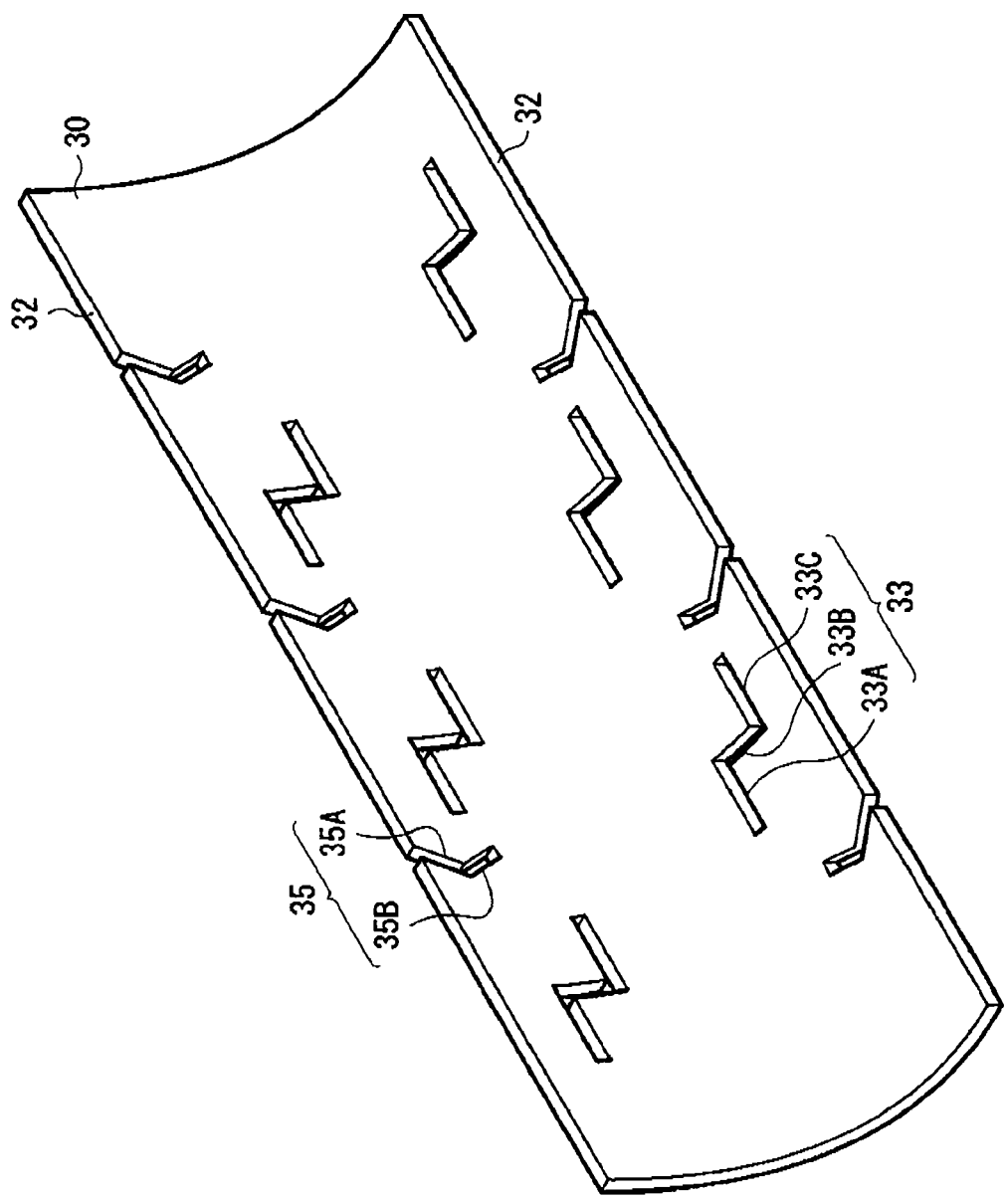
FIG. 31 is a perspective view of a further structural example of the short circuit member.
Figure 32:
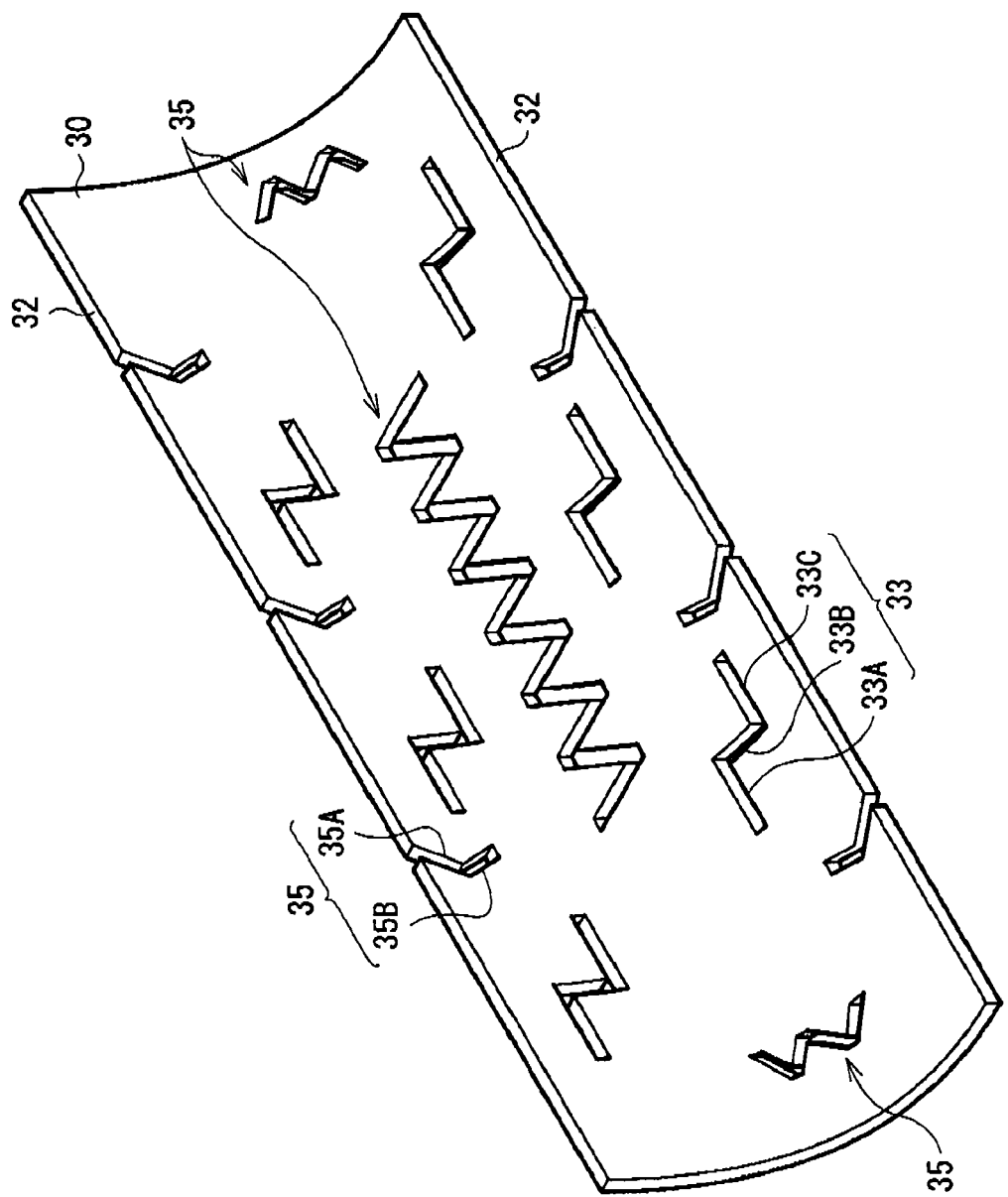
FIG. 32 is a perspective view of a further structural example of the short circuit member.
Figure 33:
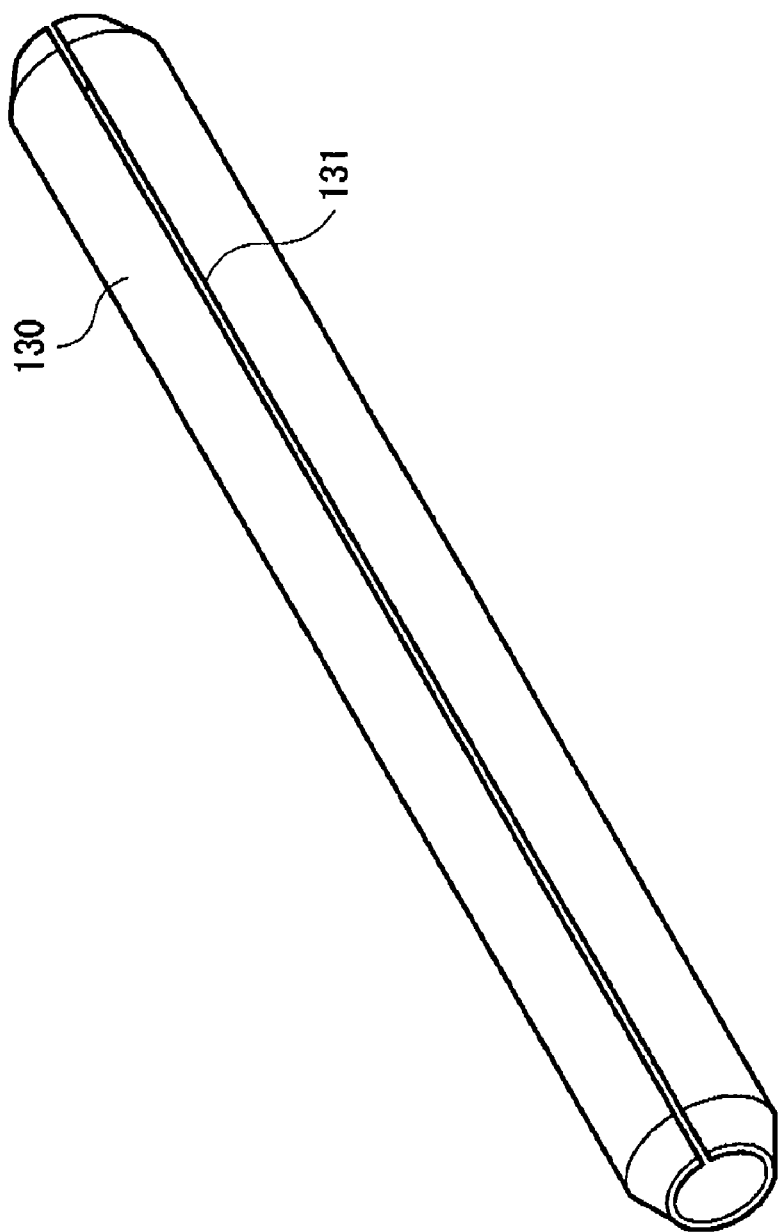
FIG. 33 is a perspective view of an example of a center pin in a related art.

A secondary battery of Example 13 was formed as in the case of Example 7, and a secondary battery of Example 14 was formed as in the case of Example 8, except that the Z type cut 33 and the Z type notch 35 shown in FIG. 31 were provided in the short circuit member 30.

A secondary battery of Comparative Example 1 was formed as in the case of Example 1, and a secondary battery of Comparative Example 2 was formed as in the case of Example 4, except that the short circuit member was not arranged.

Five (Battery 1 to Battery 5) of each of the secondary batteries of Examples 1 through 14 and Comparative Examples 1 and 2 obtained in such a manner were formed, and a crush test was subjected to the secondary batteries to check for ignition or rupture. The obtained results are shown in Tables 1 and 2.

TABLE 1

Battery shape: prismatic
Short circuit member: tubular shape/arranged in a gap between the battery can and the battery element

| | PRESENCE OR ABSENCE OF SHORT CIRCUIT MEMBER | SHAPE OF SHORT CIRCUIT MEMBER | CUT | NOTCH | RUPTURE | | | | |
|---|---|---|---|---|---|---|---|---|---|
| | | | | | BATTERY 1 | BATTERY 2 | BATTERY 3 | BATTERY 4 | BATTERY 5 |
| EXAMPLE 1 | PRESENCE | FIGS. 5, 6 | NO | NO | RUPTURE | RUPTURE | RUPTURE | RUPTURE | NO RUPTURE |
| EXAMPLE 2-1 | PRESENCE | FIG. 12 | L TYPE | NO | NO RUPTURE | NO RUPTURE | NO RUPTURE | NO RUPTURE | NO RUPTURE |
| EXAMPLE 2-2 | PRESENCE | FIG. 21 | Z TYPE | LINEAR | NO RUPTURE | NO RUPTURE | NO RUPTURE | NO RUPTURE | NO RUPTURE |
| EXAMPLE 2-3 | PRESENCE | FIG. 22 | Z TYPE | Z TYPE | NO RUPTURE | NO RUPTURE | NO RUPTURE | NO RUPTURE | NO RUPTURE |
| COMPARATIVE EXAPLE 1 | ABSENCE | — | — | — | RUPTURE | RUPTURE | RUPTURE | RUPTURE | RUPTURE |

TABLE 2

Short circuit member: plate shape

| | BATTERY SHAPE | PRESENCE OR ABSENCE OF SHORT CIRCUIT MEMBER | SHAPE OF SHORT CIRCUIT MEMBER | POSITION OF SHORT CIRCUIT MEMBER | CUT | NOTCH |
|---|---|---|---|---|---|---|
| EXAMPLE 3 | PRISMATIC | PRESENCE | FIG. 8 | INNER WALL OF CAN | NO | NO |
| EXAMPLE 4 | CYLINDRICAL | PRESENCE | FIG. 11 | INNER WALL OF CAN | NO | NO |
| EXAMPLE 5 | PRISMATIC | PRESENCE | FIG. 26 | INNER WALL OF CAN | L TYPE | NO |
| EXAMPLE 6 | CYLINDRICAL | PRESENCE | FIG. 27 | INNER WALL OF CAN | L TYPE | NO |
| EXAMPLE 7 | PRISMATIC | PRESENCE | FIG. 8 | PERIPHERY OF ELEMENT | NO | NO |
| EXAMPLE 8 | CYLINDRICAL | PRESENCE | FIG. 11 | PERIPHERY OF ELEMENT | NO | NO |
| EXAMPLE 9 | PRISMATIC | PRESENCE | FIG. 27 | PERIPHERY OF ELEMENT | L TYPE | NO |
| EXAMPLE 10 | CYLINDRICAL | PRESENCE | FIG. 27 | PERIPHERY OF ELEMENT | L TYPE | NO |
| EXAMPLE 11 | PRISMATIC | PRESENCE | FIG. 29 | PERIPHERY OF ELEMENT | Z TYPE | LINEAR |
| EXAMPLE 12 | CYLINDRICAL | PRESENCE | FIG. 29 | PERIPHERY OF ELEMENT | Z TYPE | LINEAR |
| EXAMPLE 13 | PRISMATIC | PRESENCE | FIG. 31 | PERIPHERY OF ELEMENT | Z TYPE | Z TYPE |
| EXAMPLE 14 | CYLINDRICAL | PRESENCE | FIG. 31 | PERIPHERY OF ELEMENT | Z TYPE | Z TYPE |

TABLE 2-continued

Short circuit member: plate shape

| | | | | | | |
|---|---|---|---|---|---|---|
| COMPARATIVE EXAMPLE 1 | PRISMATIC | ABSENCE | — | — | — | — |
| COMPARATIVE EXAMPLE 2 | CYLINDRICAL | ABSENCE | — | — | — | — |

| | RUPTURE | | | | |
|---|---|---|---|---|---|
| | BATTERY 1 | BATTERY 2 | BATTERY 3 | BATTERY 4 | BATTERY 5 |
| EXAMPLE 3 | RUPTURE | RUPTURE | RUPTURE | RUPTURE | NO RUPTURE |
| EXAMPLE 4 | RUPTURE | RUPTURE | RUPTURE | RUPTURE | NO RUPTURE |
| EXAMPLE 5 | NO RUPTURE | NO RUPTURE | NO RUPTURE | NO RUPTURE | NO RUPTURE |
| EXAMPLE 6 | NO RUPTURE | NO RUPTURE | NO RUPTURE | NO RUPTURE | NO RUPTURE |
| EXAMPLE 7 | RUPTURE | RUPTURE | RUPTURE | RUPTURE | NO RUPTURE |
| EXAMPLE 8 | RUPTURE | RUPTURE | RUPTURE | RUPTURE | NO RUPTURE |
| EXAMPLE 9 | NO RUPTURE | NO RUPTURE | NO RUPTURE | NO RUPTURE | NO RUPTURE |
| EXAMPLE 10 | NO RUPTURE | NO RUPTURE | NO RUPTURE | NO RUPTURE | NO RUPTURE |
| EXAMPLE 11 | NO RUPTURE | NO RUPTURE | NO RUPTURE | NO RUPTURE | NO RUPTURE |
| EXAMPLE 12 | NO RUPTURE | NO RUPTURE | NO RUPTURE | NO RUPTURE | NO RUPTURE |
| EXAMPLE 13 | NO RUPTURE | NO RUPTURE | NO RUPTURE | NO RUPTURE | NO RUPTURE |
| EXAMPLE 14 | NO RUPTURE | NO RUPTURE | NO RUPTURE | NO RUPTURE | NO RUPTURE |
| COMPARATIVE EXAMPLE 1 | RUPTURE | RUPTURE | RUPTURE | RUPTURE | RUPTURE |
| COMPARATIVE EXAMPLE 2 | RUPTURE | RUPTURE | RUPTURE | RUPTURE | RUPTURE |

It was obvious from Tables 1 and 2 that in Comparative Examples 1 and 2 in which the short circuit member was not provided, rapture took place in all five secondary batteries; however, in Examples 1, 3, 4, 7 and 8 in which the short circuit member 30 was provided, rupture could be prevented. In other words, it was found out that when the conductive short circuit member 30 was arranged in a gap between the battery element 20 and the battery can 11 or 41, even in the case where the battery was crushed or bent to cause a short circuit, safety could be improved.

Moreover, in Examples 2-1 through 2-3, 5, 6, 9, 10 through 14 in which the cut 33 or the notch 35 was provided in the short circuit member 30, rupture could be further prevented. In other words, it was found out that when the cut 33 with a bending shape or the notch 35 was provided in the short circuit member 30, safety could be further improved.

Although the present invention is described referring to the embodiments and the examples, the invention is not limited to the embodiments and the examples and can be variously modified. For example, in the embodiments and the examples, the case where the electrolyte solution as a liquid electrolyte is used is described; however, instead of the electrolyte solution, any other electrolyte may be used. Examples of the other electrolyte include a gel electrode in which a polymer holds an electrolyte solution, a solid electrode having ionic conductivity, a mixture of a solid electrolyte and an electrolyte solution, or a mixture of a solid electrolyte and a gel electrolyte.

In the gel electrolyte, various polymers which absorb an electrolyte solution to gelatinize can be used. Examples of such a polymer include a fluorine-based polymer such as a copolymer of polyvinylidene fluoride or vinylidene fluoride and hexafluoropropylene, an ether-based polymer such as polyethylene oxide or a cross-link including polyethylene oxide, polyacrylonitrile and the like. More specifically, in terms of stability of oxidation-reduction, the fluorine-based polymer is preferable.

As the solid electrolyte, for example, an organic solid electrolyte in which an electrolyte salt is dispersed in a polymer having ionic conductivity, or an inorganic solid electrolyte made of ion conductive glass or ionic crystal can be used. At this time, as the polymer, for example, an ether-based polymer such as polyethylene oxide or a cross-link including polyethylene oxide, an ester-based polymer such as polymethacrylate, an acrylate-based polymer, a mixture thereof or a copolymer thereof in molecules can be used. Moreover, as the inorganic solid electrolyte, lithium nitride, lithium iodide or the like can be used.

Further, in the embodiments and the examples, the cylindrical secondary battery having a winding structure is described; however, the invention can be applied to a secondary battery having a winding structure with any other shape. Moreover, the invention can be applied to primary batteries.

In addition, in the embodiments and the examples, the case where lithium is used as an electrode reactant is described; however, the invention can be applied to the case where any other Group 1 element in the long form of the periodic table of the elements such as sodium (Na) or potassium (K), a Group 2 element in the long form of the periodic table of the elements such as magnesium or calcium (Ca), other light metal such as aluminum, lithium or an alloy thereof is used, and the same effects can be obtained. At this time, an anode active material capable of inserting and extracting the electrode reactant, a cathode active material, a solvent or the like is selected according to the electrode reactant.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising:
a battery element including a cathode and an anode;
a battery can containing the battery element; and
a conductive short circuit member arranged in a gap between the battery element and the battery can, the short circuit member being conductive and capable of biting into the battery element when the battery can is deformed, and wherein the short circuit member has a tubular shape, and has a slit in a longitudinal direction.

2. The battery according to claim 1, wherein the battery element has a structure in which the cathode and the anode are laminated and spirally wound, the cathode including a cathode active material layer on a surface of a strip-shaped cathode current collector, and the anode including an anode active material layer on a surface of a strip-shaped anode current collector.

3. The battery according to claim 2, wherein the cathode includes a cathode exposed region not including the cathode active material layer on both surfaces in an end portion on an outer side of the wound cathode, and the anode includes an anode exposed region not including anode active material layer on both surfaces in an end portion on an outer side of the wound anode.

4. The battery according to claim 2, wherein a tubular center pin is included in the center of the battery element.

5. The battery according to claim 1, wherein the anode includes an anode active material capable of inserting and extracting an electrode reactant, and including at least one kind selected from metal elements and metalloid elements as an element.

6. The battery according to claim 5, wherein the anode includes a material including at least one of tin and silicon as an element as the anode active material.

7. The battery according to claim 5, wherein as the anode active material, the anode includes a CoSnC-containing material in which tin, cobalt and carbon are included as elements, and the carbon content is 9.9 wt % to 29.7 wt % inclusive, and the ratio of cobalt to the total of tin and cobalt is 30 wt % to 70 wt % inclusive.

8. A battery comprising:
a battery element including a cathode and an anode;
a battery can containing the battery element; and
a conductive short circuit member arranged in a gap between the battery element and the battery can, the short circuit member capable of biting into the battery element when the battery can is deformed, wherein the short circuit member has a cut with a bending shape, and wherein the cut includes two or more linear portions, and one of the two or more linear portions extends from an end of another linear portion in a direction different from the direction of another linear portion.

9. A battery comprising:
a battery element including a cathode and an anode;
a battery can containing the battery element; and
a conductive short circuit member arranged in a gap between the battery element and the battery can, the short circuit member being conductive and capable of biting into the battery element when the battery can is deformed, wherein the short circuit member has a cut with a bending shape.

10. The battery according to claim 9, wherein the battery element has a structure in which the cathode and the anode are laminated and spirally wound, the cathode including a cathode active material layer on a surface of a strip-shaped cathode current collector, and the anode including an anode active material layer on a surface of a strip-shaped anode current collector.

11. The battery according to claim 10, wherein the cathode includes a cathode exposed region not including the cathode active material layer on both surfaces in an end portion on an outer side of the wound cathode, and the anode includes an anode exposed region not including anode active material layer on both surfaces in an end portion on an outer side of the wound anode.

12. The battery according to claim 10, wherein a tubular center pin is included in the center of the battery element.

13. The battery according to claim 9, wherein the anode includes an anode active material capable of inserting and extracting an electrode reactant, and including at least one kind selected from metal elements and metalloid elements as an element.

14. The battery according to claim 13, wherein the anode includes a material including at least one of tin and silicon as an element as the anode active material.

15. The battery according to claim 13, wherein as the anode active material, the anode includes a CoSnC-containing material in which tin, cobalt and carbon are included as elements, and the carbon content is 9.9 wt % to 29.7 wt % inclusive, and the ratio of cobalt to the total of tin and cobalt is 30 wt% to 70 wt % inclusive.

* * * * *